(12) United States Patent
Nair

(10) Patent No.: US 9,891,142 B2
(45) Date of Patent: Feb. 13, 2018

(54) TIME-STAMPING AND SYNCHRONIZATION FOR SINGLE-WIRE SAFETY COMMUNICATION

(71) Applicant: Rockwell Automation Technologies, Inc., Mayfield Heights, OH (US)

(72) Inventor: Suresh R. Nair, Amherst, NH (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 497 days.

(21) Appl. No.: 14/550,833

(22) Filed: Nov. 21, 2014

(65) Prior Publication Data

US 2016/0146710 A1    May 26, 2016

(51) Int. Cl.
  G06F 11/30    (2006.01)
  G01M 99/00    (2011.01)
  G05B 9/02     (2006.01)

(52) U.S. Cl.
  CPC ............ *G01M 99/008* (2013.01); *G05B 9/02* (2013.01)

(58) Field of Classification Search
  USPC ........................................................ 702/183
  See application file for complete search history.

(56) References Cited

U.S. PATENT DOCUMENTS

| | | | | |
|---|---|---|---|---|
| 6,662,124 B2* | 12/2003 | Schweitzer, III | .... | H02H 1/0007 324/76.15 |
| 7,496,099 B2* | 2/2009 | Franchuk | ............ | H04L 12/1881 370/359 |
| 9,461,459 B2 | 10/2016 | Henneberger | | |
| 2005/0057868 A1 | 3/2005 | Pullmann et al. | | |
| 2007/0263595 A1* | 11/2007 | Charrat | ................... | H04L 45/54 370/351 |
| 2009/0252068 A1 | 10/2009 | Charles et al. | | |
| 2011/0241447 A1 | 10/2011 | Ando et al. | | |
| 2012/0268107 A1 | 10/2012 | Laturner | | |
| 2014/0075235 A1* | 3/2014 | Chandhoke | .......... | H04J 3/0667 713/401 |

(Continued)

FOREIGN PATENT DOCUMENTS

| | | |
|---|---|---|
| CN | 100392410 C | 6/2008 |
| EP | 1521145 | 4/2005 |

(Continued)

OTHER PUBLICATIONS

European Office Action for EP Application Serial No. 15195659.6, dated May 31, 2016, 2 pages.

(Continued)

*Primary Examiner* — Timor Karimy
(74) *Attorney, Agent, or Firm* — Amin, Turocy & Watson, LLP

(57) ABSTRACT

A time-stamping layer is provided for time-stamping of events detected in an industrial safety system. The technique implemented by the time-stamping layer uses autonomous device counters and simple arithmetic to label detected events (e.g., safety switching events) with accurate time-stamps without the need to synchronize clocks of the individual safety input devices and safety relay on the safety circuit. In some embodiments, the time-stamping technique is implemented in a single-wire safety system architecture that yields reliable safety device monitoring without the need for dual redundant signal channels.

20 Claims, 24 Drawing Sheets

(56) References Cited

U.S. PATENT DOCUMENTS

| | | | |
|---|---|---|---|
| 2014/0100675 | A1 | 4/2014 | Dold |
| 2014/0101486 | A1 | 4/2014 | Henneberger et al. |
| 2016/0178125 | A1 | 6/2016 | Nair et al. |
| 2016/0290559 | A1 | 10/2016 | Nair et al. |
| 2016/0299484 | A1 | 10/2016 | Nair et al. |

FOREIGN PATENT DOCUMENTS

| | | |
|---|---|---|
| EP | 2383623 | 11/2011 |
| EP | 2383762 | 11/2011 |
| EP | 3023848 | 5/2016 |

OTHER PUBLICATIONS

European Office Action for EP Application Serial No. 15201993.1, dated Jul. 4, 2016, 2 pages.
Extended European Search Report for European Application Serial No. 15201993.1, dated May 23, 2016, 8 pages.
Extended European Search Report for European Application Serial No. 15195659.6, dated Mar. 24, 2016, 8 pages.
Non- Final Office Action for U.S. Appl. No. 15/187,850, dated Apr. 6, 2017, 23 pages.
Non- Final Office Action for U.S. Appl. No. 15/187,859, dated Apr. 10, 2017, 20 pages.
Non- Final Office Action for U.S. Appl. No. 14/580,178, dated Mar. 24, 2017, 28 pages.
Notice of Allowance for U.S. Appl. No. 15/187,850 dated Aug. 7, 2017, 15 pages.
Notice of Allowance for U.S. Appl. No. 15/187,859 dated Aug. 16, 2017, 19 pages.
Notice of Allowance for U.S. Appl. No. 14/580,178 dated Jul. 11, 2017, 21 pages.
Extended European Search Report for European Application Serial No. 17176561.3 dated Nov. 7, 2017, 9 pages.
Extended European Search Report for European Application Serial No. 17176560.5 dated Nov. 15, 2017, 8 pages.
English translation of Office Action and Search Report for Chinese Application Serial No. 201510819047.5 dated Sep. 22, 2017, 6 pages.

* cited by examiner

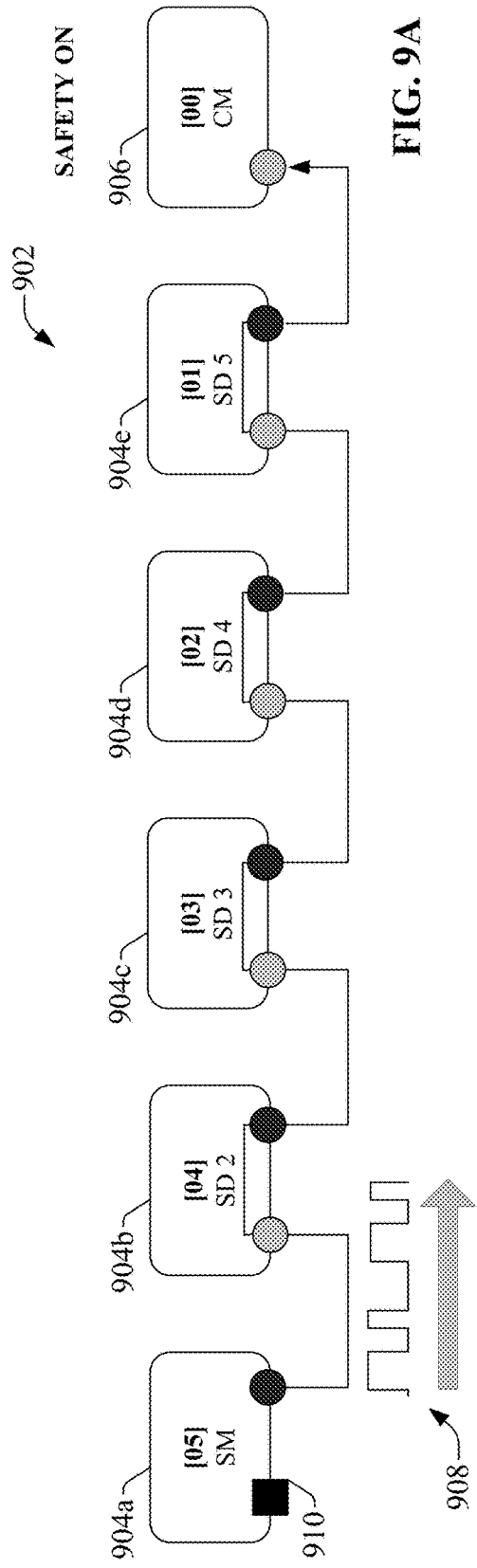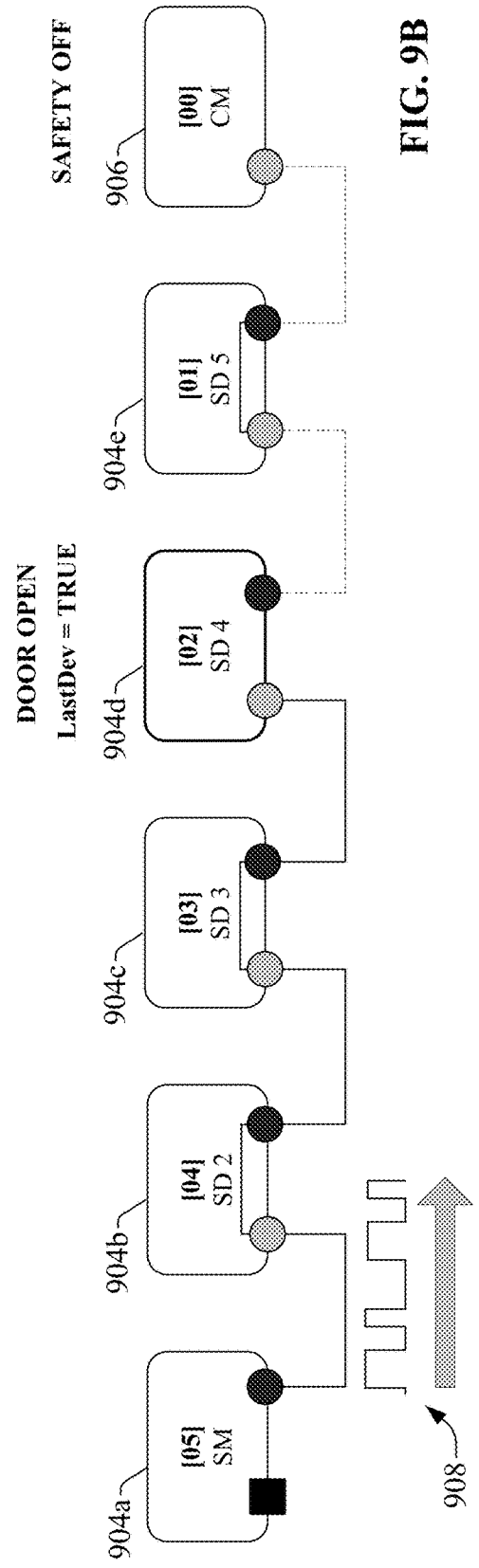

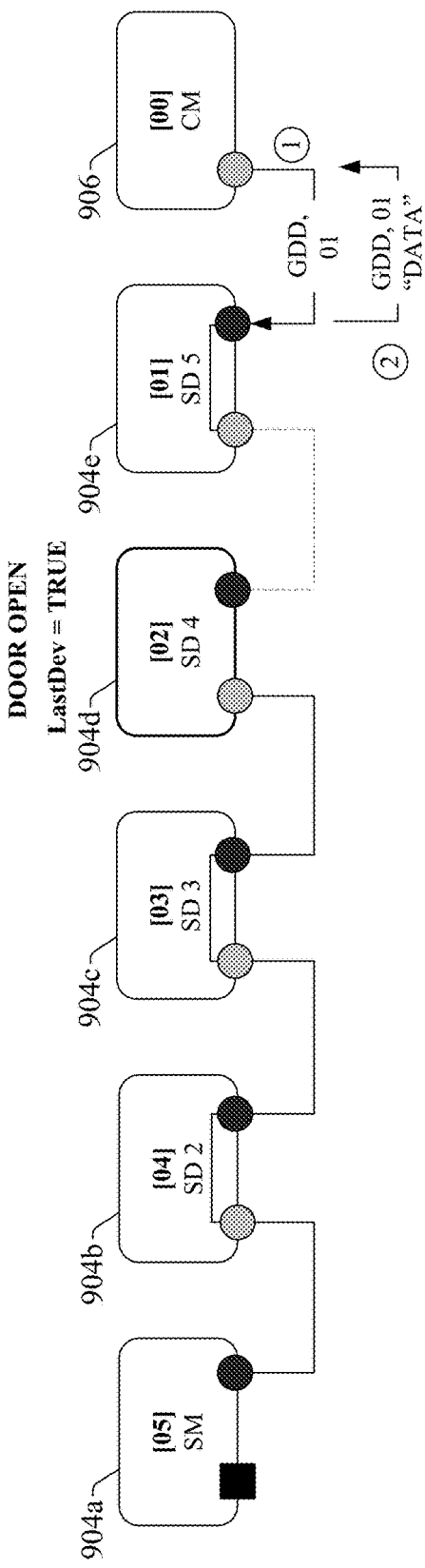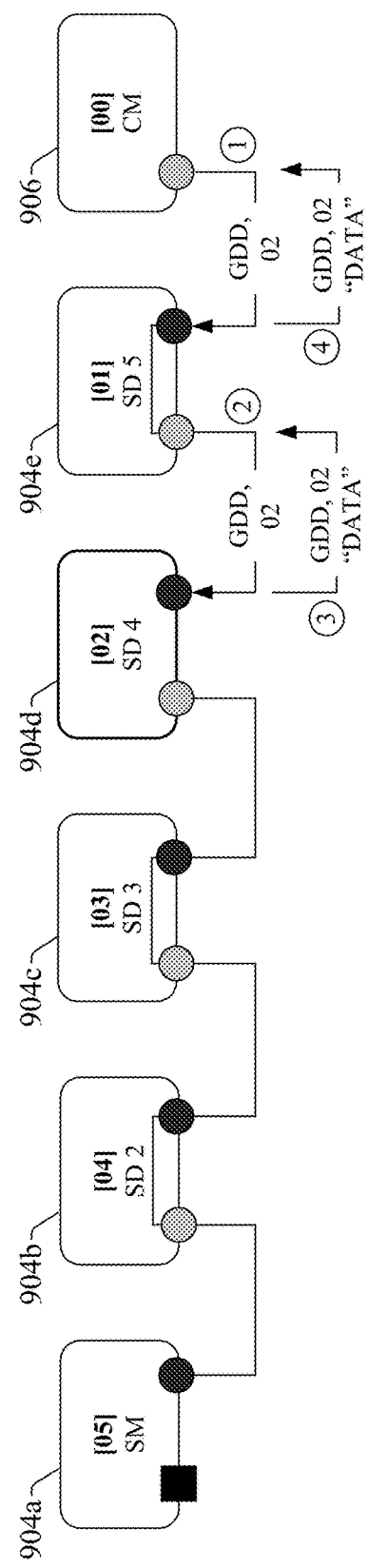
FIG. 9C
FIG. 9D

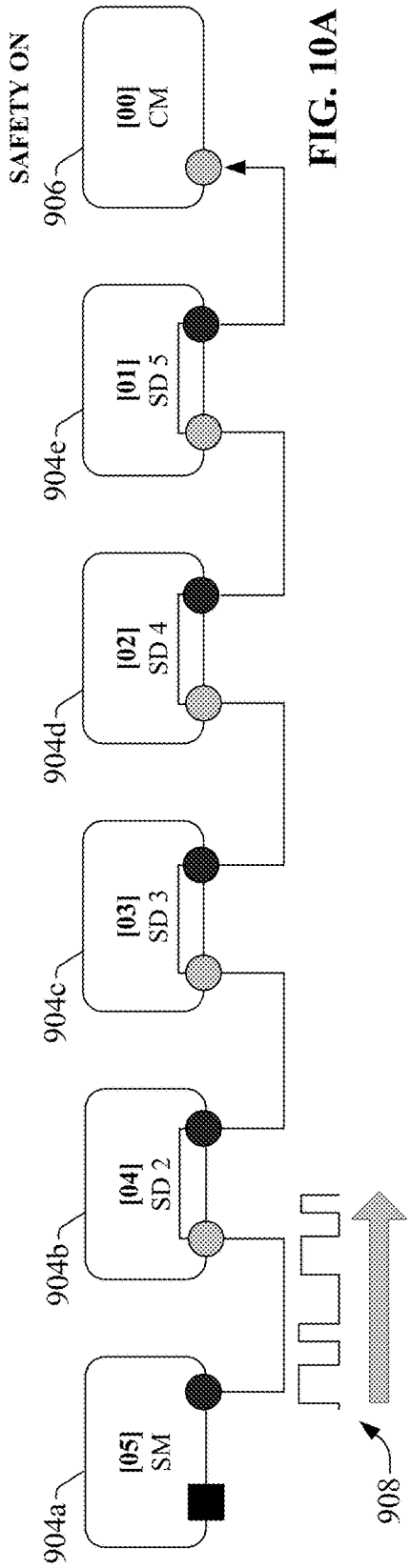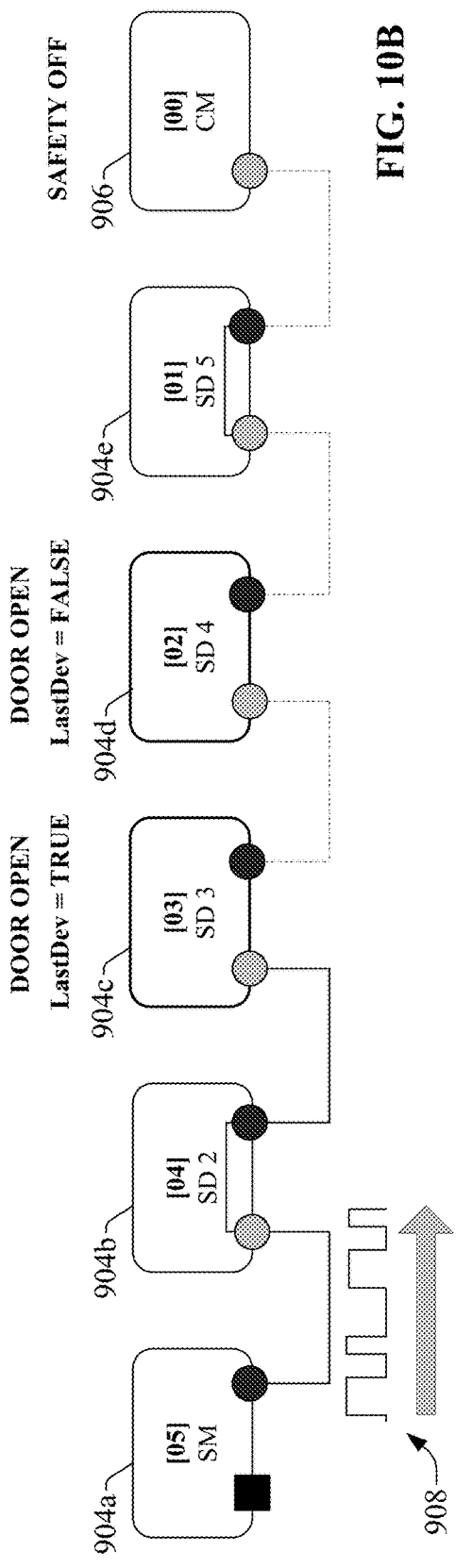

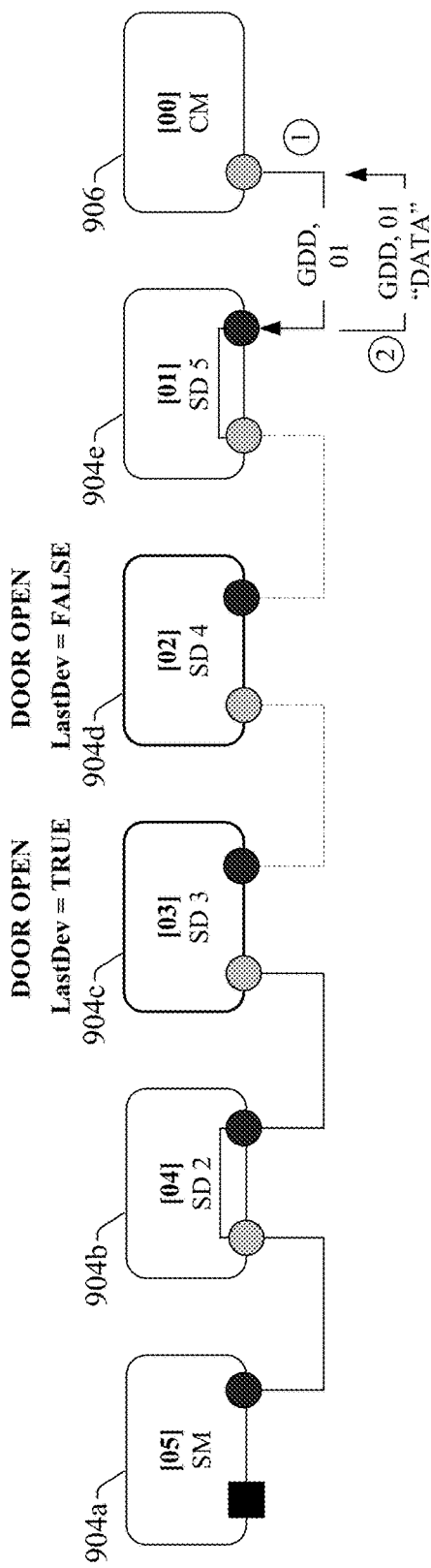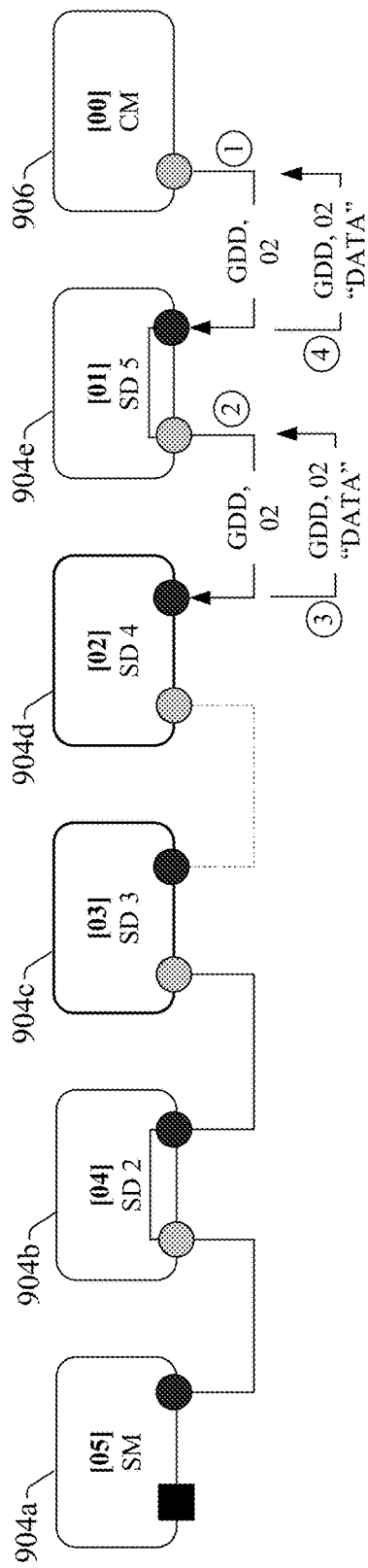

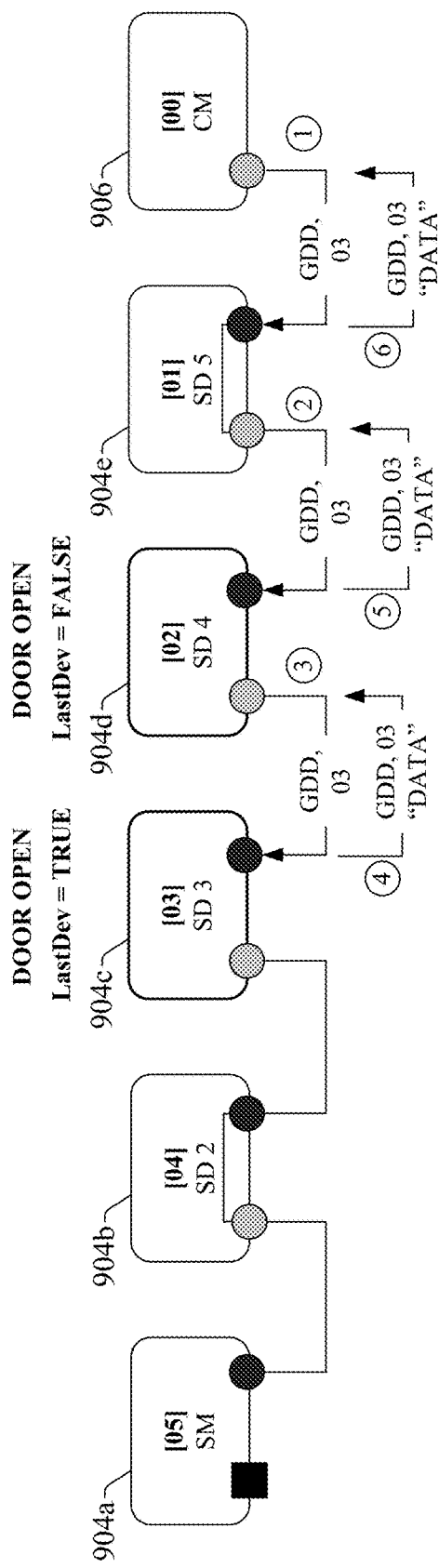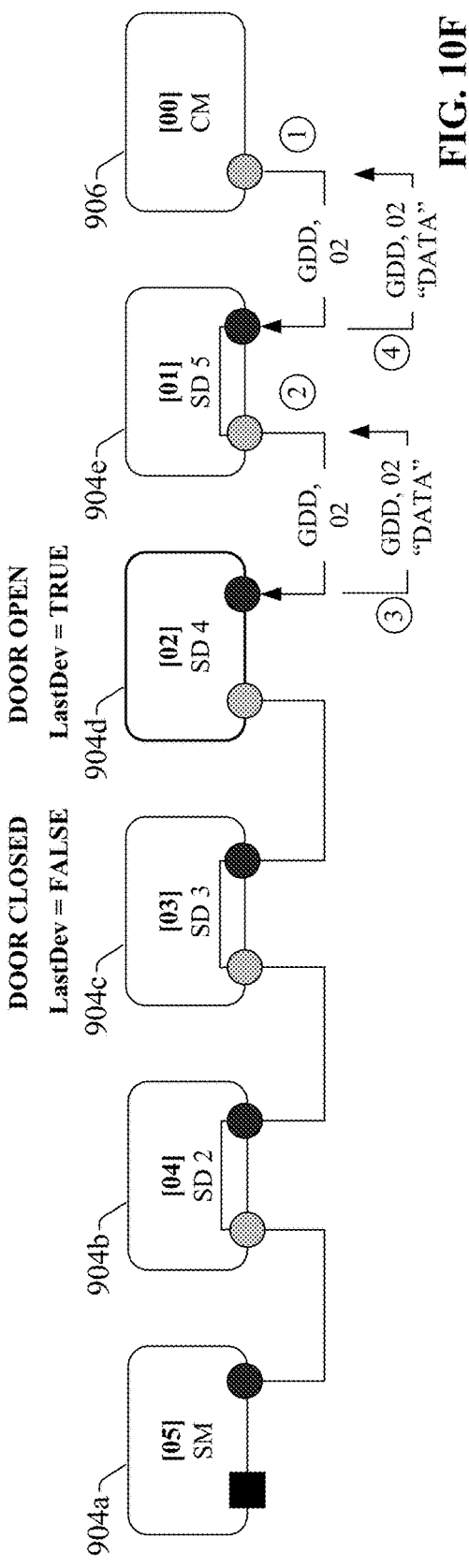

TIME-STAMPING AND SYNCHRONIZATION FOR SINGLE-WIRE SAFETY COMMUNICATION

BACKGROUND

The subject matter disclosed herein relates generally to industrial safety systems, and, more particularly, to techniques for time-stamping events detected on an industrial safety system without synchronizing devices on the safety circuit.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a safety relay device is provided, comprising a counter component configured to periodically increment a counter at a defined frequency; a device diagnostic component configured to output a diagnostic request message directed to a safety input device on an industrial safety circuit and to record a first value of the counter corresponding to a first time at which the diagnostic message was output; and a message processing component configured to extract a return counter value included in a diagnostic response message received in response to the diagnostic request message, and to generate a time-stamp for an event detected by the safety input device based on the first value, the return counter value, and a second value of the counter corresponding to a second time at which the diagnostic response message is received at the safety relay.

Also, one or more embodiments provide a method for time-stamping events on an industrial safety circuit, comprising sending, by a safety relay device comprising at least one processor, a diagnostic request message directed to a safety input device on the industrial safety circuit; storing, by the safety relay device, a first value of a periodically incrementing counter maintained on the safety relay device in a first register, wherein the first value corresponds to a first time of the sending of the diagnostic request message; receiving, by the safety relay device, a diagnostic response message in response to the diagnostic request message, wherein the diagnostic response message includes at least a return counter value generated by the safety input device; storing, by the safety relay device, a second value of the counter in a second register, wherein the second value corresponds to a second time of the receiving the diagnostic response message; reading, by the safety relay device, the return counter value included in the diagnostic response message; and generating, by the safety relay device, a time-stamp for an event detected by the safety input device based on the first value, the second value, and the return counter value.

Also, according to one or more embodiments, a non-transitory computer-readable medium is provided having stored thereon instructions that, in response to execution, cause a system to perform operations, the operations comprising outputting, via an safety channel terminal of the safety relay device, a diagnostic request message addressed to a safety input device on an industrial safety circuit; recording a first value of a periodically incrementing counter maintained on the safety relay device in a first register, wherein the first value corresponds to a first time of the outputting of the diagnostic request message; receiving, via the safety channel terminal, a diagnostic response message in response to the diagnostic request message, wherein the diagnostic response message comprises at least a return counter value generated by the safety input device; recording a second value of the counter in a second register, wherein the second value corresponds to a second time of the receiving of the diagnostic response message; reading the return counter value from the diagnostic response message; and generating a time-stamp for an event detected by the safety input device based on the first value, the second value, and the return counter value.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIGS. 9A-9D are block diagrams illustrating safety and diagnostic modes for an example single-wire safety system.

FIGS. 10A-10F are block diagrams illustrating how messaging is performed in a scenario in which multiple safety devices switch to their unsafe state.

DETAILED DESCRIPTION

Figure 1:
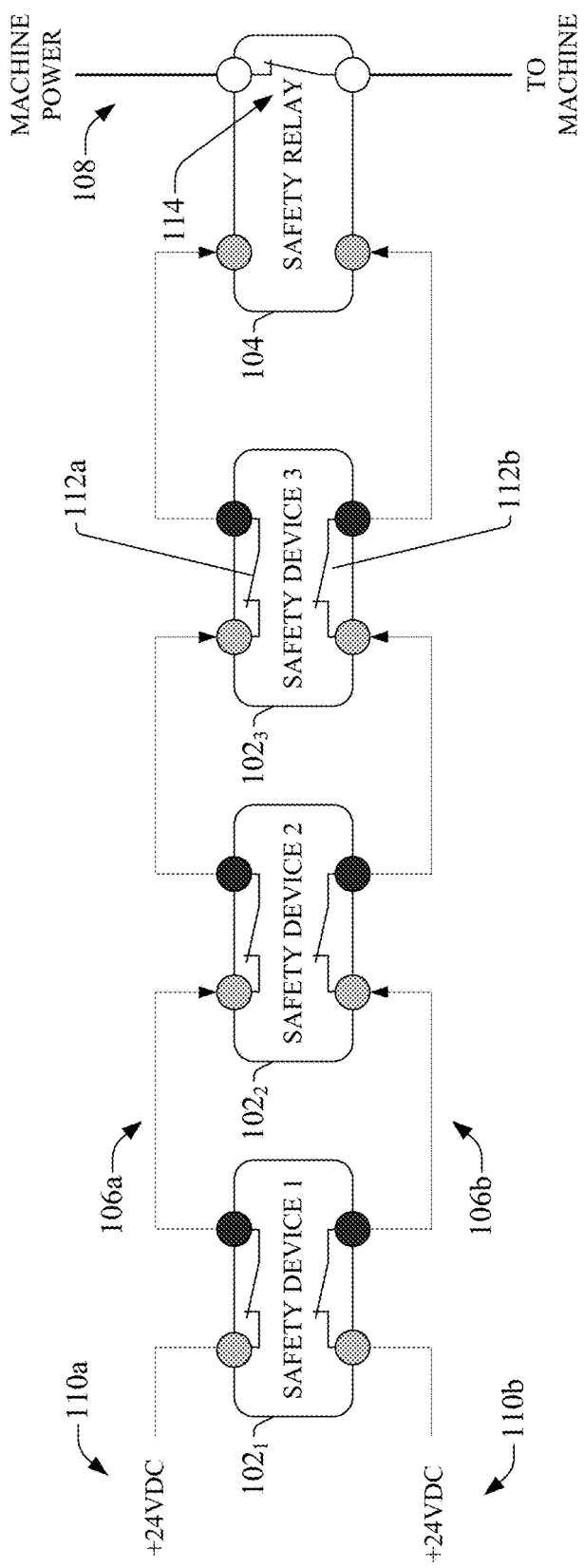
FIG. 1 is a block diagram of an example safety circuit that utilizes redundant signal paths to improve safety reliability.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Modern industrial automation systems often include a number of hazardous machine access points that, if inappropriately breached, may cause injury to an operator. These access points can expose the operator to risks associated with dangerous machine components, including but not limited to crushing by moving parts, electrocution through contact with exposed high-voltage lines or components, chemical burn, laceration or dismemberment by a moving blade, radiation exposure, or other such hazards To mitigate the risks associated with these access points, plant engineers typically implement safety systems designed to protect operators who interact with the access points. These safety systems often include a safety relay or controller that monitors the states of various safety input devices, and disconnects power to hazardous machine components if any of the safety input devices indicate a potentially unsafe condition. An example safety input device may comprise a proximity switch installed on a safety gate that provides access to a hazardous machine. The proximity switch output may be provided as an input to the safety relay, which operates a contactor to isolate power from the machine when the proximity switch indicates that the safety gate is open. In another example, an access point that allows an operator to load a part in a stamping press area may be protected by a light curtain that detects when a physical body (e.g., an operator's arm) has reached through the access point. As with the example proximity switch described above, the light curtain's output can be tied to the safety relay as an input, such that the safety relay isolates power to the press while the light curtain is broken by the detected body Other example safety input devices can include, but are not limited to, emergency stop pushbuttons, industrial safety mats that detect human presence at a particular area based on weight detection, emergency pull-cord devices, photoelectric or laser-based sensors, or other such safety detection devices.

The functional safety solutions implemented for a hazardous access point must be compliant with current industry-specific functional safety standards, such as those defined by the International Organization for Standardization (ISO) or the International Electrotechnical Commission (IEC). Such standards may define formal methodologies for determining a risk level associated with a machine, and provide statutory guidelines for designing safety systems to mitigate the risk. These safety standards dictate safety system types and configurations that must be implemented to counter a particular type of hazard.

To ensure highly reliable safety response even in the event of a failure of one or more safety input devices, safety systems are often designed with dual redundant channels for conveying a safety signal. FIG. 1 illustrates an example safety circuit that utilizes redundant signal paths to improve safety reliability. In this example, safety devices 102 are connected in series to a safety relay 104. Safety devices 102 comprise devices that verify whether the safety relay should enter the safe state based on their respective access points, including but not limited to proximity switches that determine when a safety gate is in the closed position, emergency stop pushbuttons, safety mats, light curtains, etc. Each of the safety devices 102 are equipped with dual redundant contacts 112a and 112b that are designed to close when the device is in the safe state, allowing respective 24 signals 110 to pass.

Safety relay 104 includes at least one resettable contact 114 that controls the connection of machine power 108 to at least one machine, motor, or industrial device. Safety relay 104 will only allow the contact 114 to be reset if both 24 VDC signals are detected, indicating that all safety devices 102 have validated their safety functions. If any of the safety devices 102 switch to a safe state (e.g., a light curtain is broken, an emergency stop button is pressed, a safety door is opened, etc.), the circuit to the safety relay 104 is broken, and the safety relay 104 isolates power from the machine, placing the industrial system in a safe state by preventing hazardous motion.

The use of two separate paths through the safety devices improves safety reliability by ensuring that the safety relay 104 disconnects machine power when a safety device switches to a safe state even in the event that one of the safety device's internal contacts has failed. That is, even if one of the two contacts within a safety device has fused closed, the second contact will still open in response to detection of the safe state, ensuring that the safety relay 104 will see the loss of the 24 VDC signal and disconnect power from the machine. While providing an enhanced degree of safety reliability, implementation of dual redundant signal paths consumes additional terminal space and doubles the wiring requirement relative to a single-wire solution. Moreover, the presence of two separate channels introduces the possibility of cross faults between the two lines, which can prevent the safety relay from detecting an open in the safety circuit.

In a separate issue, multi-device systems often require precise event coordination between the distributed devices making up the system. Such coordination requires that the internal system clocks of the devices are synchronized with one another to a high degree of precision. Since internal system clocks are susceptible to drift—whereby the clocks of multiple devices gradually fall out of synchronization due to differences in clock rates—multi-device systems often include clock synchronization sub-systems that ensure the device clocks remain synchronized within a reasonable tolerance. For systems requiring nanosecond or microsecond resolution, clock synchronization techniques may be complicated and require considerable processing overhead due to the need to constantly adjust clock counts to remain within precise tolerances. For systems with lower precision requirements (e.g., tens of milliseconds), such synchronization techniques may be unnecessarily complicated and processing intensive.

To address these and other issues, one or more embodiments of the present disclosure relate to an industrial safety system that includes a lightweight time-stamping and synchronization protocol layer. The time-stamping layer can determine and report timing of events on the safety system (e.g., demand events, switching events, fault events, etc.) relative to a real-time system clock located outside of the safety system. The devices comprising the safety system implement the time-stamping functionality using autonomous counters or timers together with simple mathematics, resulting in a light-weight, low-complexity time-stamping system that nevertheless provides a level of resolution adequate for the types of events being monitored.

Figure 2:
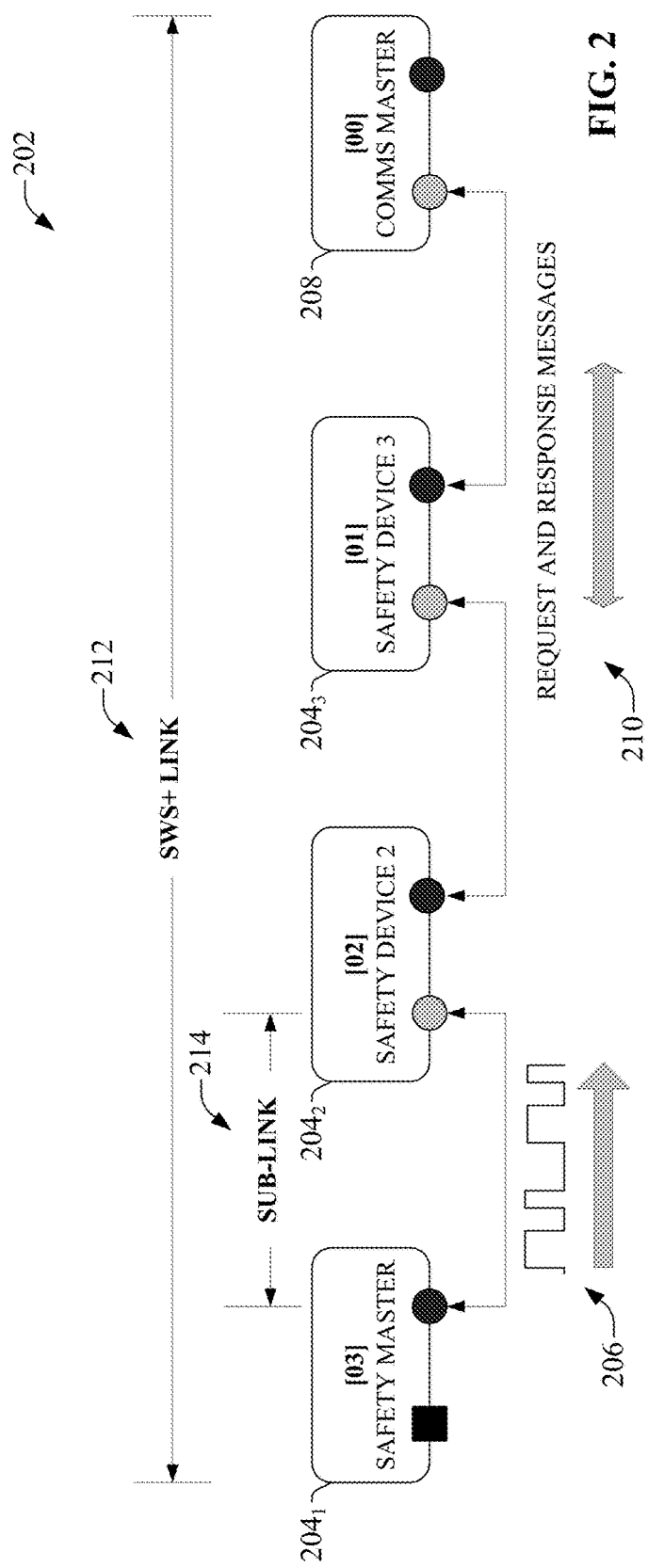
FIG. 2 is a block diagram of an example single-wire safety system architecture.

Although the time-stamping functionality described herein can be implemented on substantially any type of industrial safety system comprising multiple safety input devices, the time-stamping techniques and examples herein are described in the context of a single-wire safety system architecture that provides reliable safety device monitoring without the need for dual redundant signal channels. FIG. 2 illustrates an example single-wire safety system architecture 202 according to one or more embodiments. The safety system architecture 202 comprises a safety relay acting as a communications master 208 (referred to herein as a "comms master") and three safety devices 204 connected in series with the safety relay (although any number of safety devices may be added to the safety circuit without departing from the scope of this disclosure). The safety devices are configured for compliance with a single-wire safety communication protocol, to be described in more detail herein. Safety device $204_1$, which is farthest from the comms master 208 in the communication chain, serves as a safety master. A safety device acting as safety master generates a defined pulse train 206 that is passed through each safety device in the chain to the comms master 208 (the safety relay), which remains in operational mode as long as the defined pulse train 206 is recognized. The total path between the safety master $204_1$ and the comms master 208 comprises a single-wire safety plus (SWS+) link 212, which is made up of multiple sub-links 214 between adjacent safety devices on the circuit. When one of the safety devices 204 identifies the loss of its safety function (e.g., opening of a safety gate, pressing of an emergency stop button, etc.) and enters the safe state, that device ceases to pass the pulse train 206 to downstream devices, preventing the signal from reaching the comms master 208. Upon detecting loss of the pulse train signal, the comms master 208 isolates power to the industrial system components (e.g., machine, industrial device, motor, etc.).

In some embodiments, to ensure a high degree of safety reliability without the use of dual redundant signal channels, each safety device on the circuit is configured to perform a two-channel evaluation of the pulse signal. Moreover, the safety master $204_1$, which generates the pulse train 206, can be configured to monitor two-channel feedback of the output signal, such that short-circuiting of the signal to 24 VDC, 0 VDCC, or to other clocked signals can be detected.

The architecture implements a bi-directional communication protocol on the single-wire safety channel, allowing the devices in the chain to share information—including but not limited to status data, address information, presence indications, etc. —via the same channel over which the pulsed signal is sent. The single-wire protocol allows the safety devices to exchange request and response messages 210 over the channel, while coordinating sending and receiving of these messages with transmission of the pulse train 206.

Figure 3:
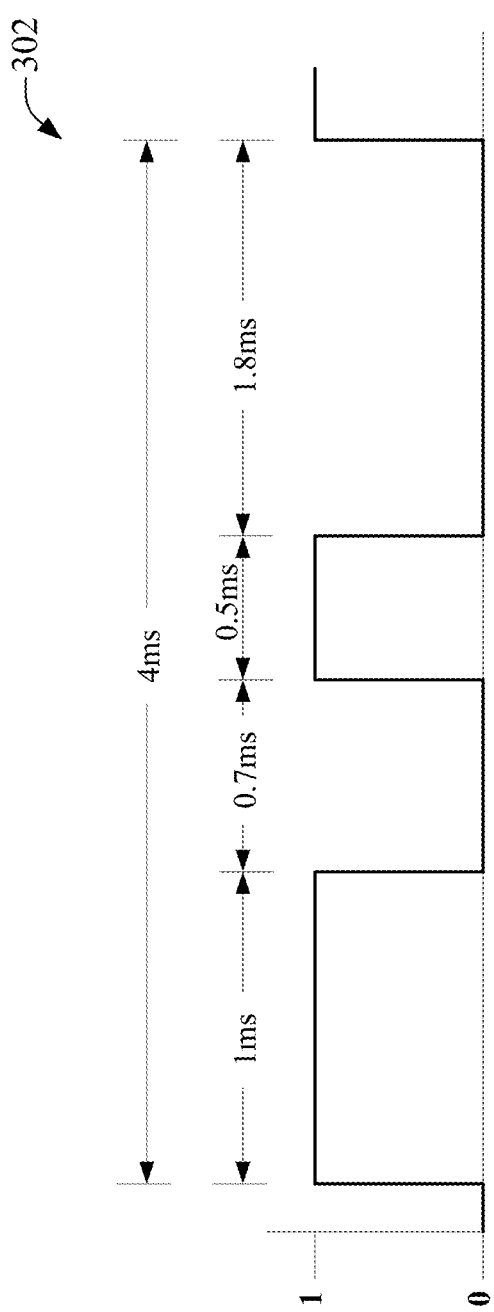
FIG. 3 is a timing chart of an example pulse signal that can be generated by a safety master device.

FIG. 3 is a timing diagram of an example pulse signal 302 that can be generated by the safety master device. The pulse pattern illustrated in FIG. 3 is not intended to be limiting, and it is to be appreciated that any pulse pattern may be implemented without departing from the scope of one or more embodiments of this disclosure. In this example, the pulse signal 302 has a total period of 4 ms, comprising a 1 ms ON signal, a 0.7 ms OFF signal, a 0.5 ms ON signal, and a 1.8 ms OFF signal. Safety devices and comms masters compliant with the single-wire protocol can be configured to recognize and generate this pulse pattern. The comms master can be configured to enable the safety relay outputs when this pulse pattern is received from the safety device nearest to the comms master on the safety circuit.

Figure 4:
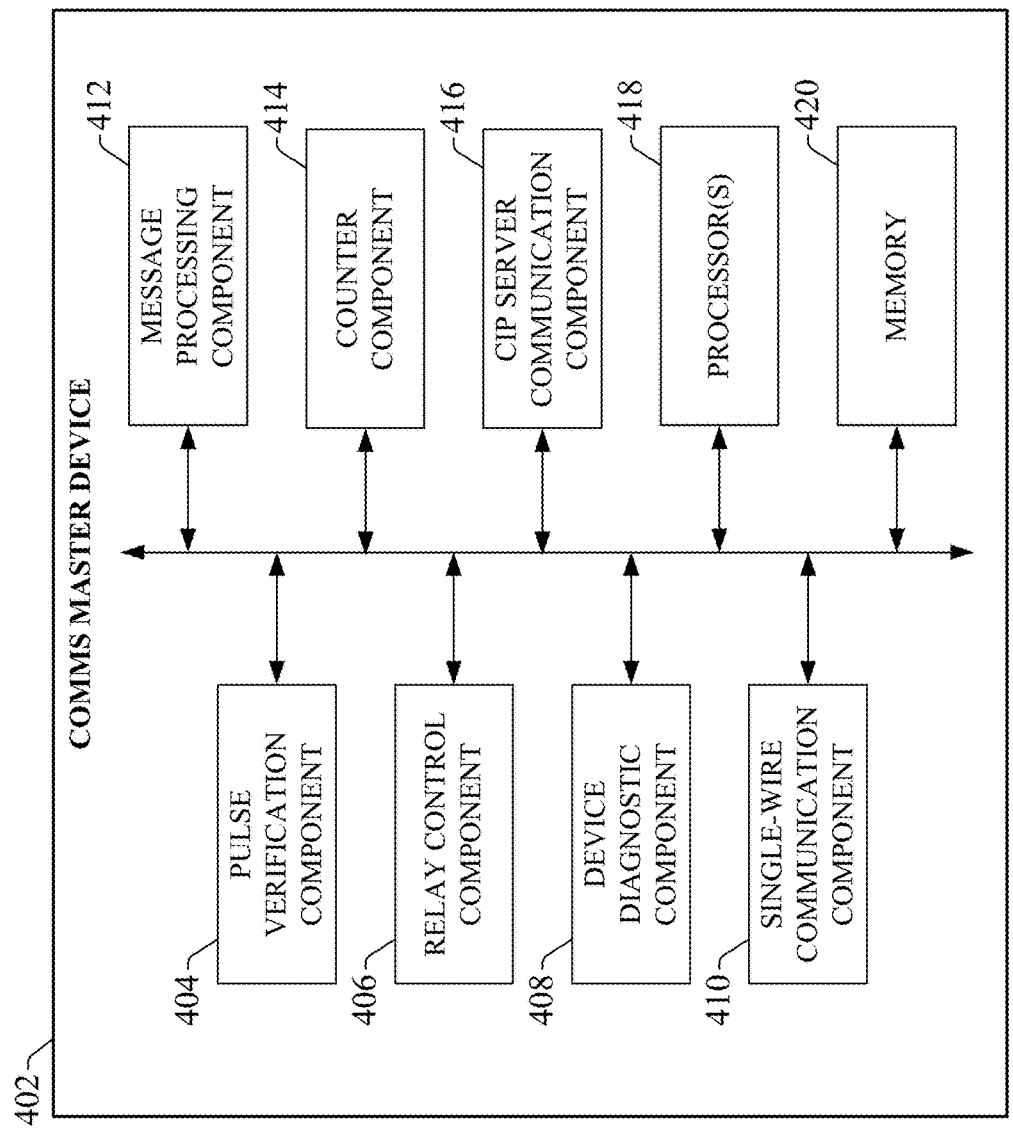
FIG. 4 is a block diagram of an example comms master device.

FIG. 4 is a block diagram of an example comms master device according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Comms master device 402 can include a pulse verification component 404, a relay control component 406, a device diagnostic component 408, a single-wire communication component 410, a message processing component 412, a counter component 414, a CIP server communication component 416, one or more processors 418, and memory 420. In various embodiments, one or more of the pulse verification component 404, relay control component 406, device diagnostic component 408, single-wire communication component 410, message processing component 412, counter component 414, CIP server communication component 416, the one or more processors 418, and memory 420 can be electrically and/or communicatively coupled to one another to perform one or more of the functions of the comms master device 402. In some embodiments, components 404, 406, 408, 410, 412, 414, 416 can comprise software instructions stored on memory 420 and executed by processor(s) 418. Comms master device 402 may also interact with other hardware and/or software components not depicted in FIG. 4. For example, processor(s) 416 may interact with one or more external user interface devices, such as a keyboard, a mouse, a display monitor, a touchscreen, or other such interface devices.

Pulse verification component 404 can be configured to receive a pulse signal via a single-wire safety input terminal and identify a defined pulse pattern conveyed on the signal (e.g., the example pulse pattern illustrated in FIG. 3 or another pulse pattern). Relay control component 406 can be configured to control the state of one or more safety relays based on detection of the defined pulse pattern by the pulse verification component 404. Device diagnostic component 408 can be configured to exchange message signals with the safety devices in connection with collecting fault or status information from the devices. Single-wire communication component 410 can be configured to coordinate bi-directional data traffic on the signal-wire channel. Message processing component 412 can be configured to process input messages received on the single-wire safety input terminal and to send output messages on the single-wire safety output terminal for transmission on the single-wire safety channel. Messages sent and received via the single-wire safety input terminal can include, but are not limited to, device information request and response messages, messages indicating that the comms master device is active, time-stamp information, and other such messages. It is to be appreciated that the time-stamping techniques described herein is not limited to use by safety devices that use single-wire communication, but rather can be implemented on safety systems in which the safety devices communicate via other types of channels. Accordingly, the single-wire communication component 410 may be omitted in some embodiments that do not use single-wire communication.

Counter component 416 can be configured to periodically increment a counter value at a defined rate (e.g., 1 ms per count), the count value being used to determine time-stamp information for detected events. CIP server communication component 416 can be configured to exchange messages with a separate control and information protocol (CIP) server that queries the comms master device 402 for information relating to the single-wire safety communication link, as well as serves information to one or more higher-level devices. The one or more processors 418 can perform one or more of the functions described herein with reference to the systems and/or methods disclosed. Memory 420 can be a computer-readable storage medium storing computer-executable instructions and/or information for performing the functions described herein with reference to the systems and/or methods disclosed.

Figure 5:
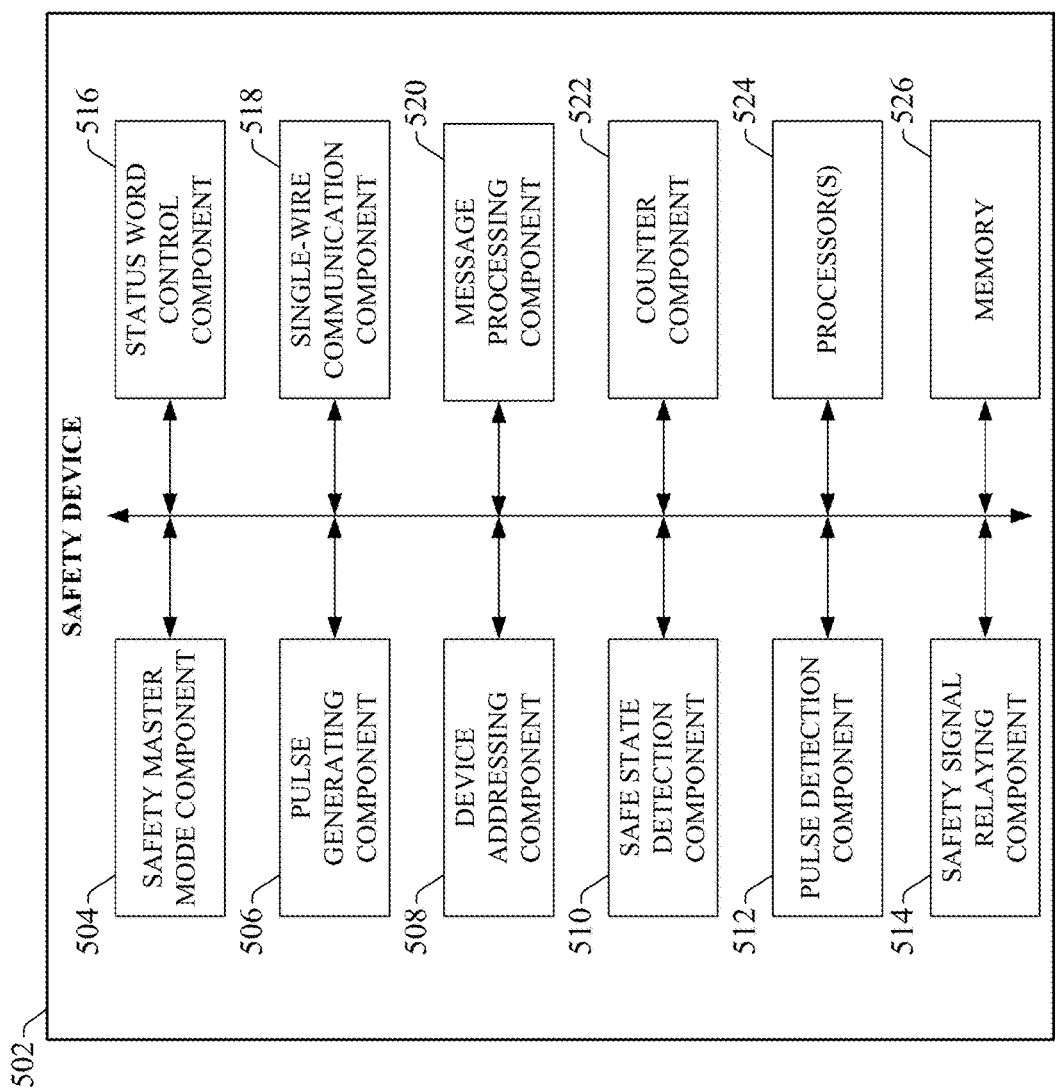
FIG. 5 is a block diagram of an example SWS+ safety device.

FIG. 5 is a block diagram of an example safety device 502 according to one or more embodiments of this disclosure. Safety device 502 can comprise substantially any type of safety input device, including but not limited to an emergency stop pushbutton, a light curtain, photo sensor, a safety mat, a safety door switch (e.g., a proximity switch or reed switch), an emergency pull cord device, a laser scanner, or other type of safety input device.

Safety device 502 can include a safety master mode component 504, a pulse generating component 506, a device addressing component 508, a safe state detection component 510, a pulse detection component 512, a safety signal relaying component 514, a status word control component 516, a single-wire communication component 518, a message processing component 520, a counter component 522, one or more processors 524, and memory 526. In various embodiments, one or more of the safety master mode component 504, pulse generating component 506, device addressing component 508, safe state detection component 510, pulse detection component 512, safety signal relaying component 514, status word control component 516, single-wire communication component 518, message processing component 520, counter component 522, the one or more processors 524, and memory 526 can be electrically and/or communicatively coupled to one another to perform one or more of the functions of the safety device 502. In some embodiments, components 504, 506, 508, 510, 512, 514, 516, 518, 520, and 522 can comprise software instructions stored on memory 526 and executed by processor(s) 524. Safety device 502 may also interact with other hardware and/or software components not depicted in FIG. 5. For example, processor(s) 524 may interact with one or more external user interface devices, such as a keyboard, a mouse, a display monitor, a touchscreen, or other such interface devices.

Safety master mode component 504 can be configured to control whether the safety device 502 operates as a safety master device within a single-wire safety system. If the safety device 502 operates in safety master mode, the device 502 will generate the pulsed safety signal to be placed on the single-wire communication channel. Alternatively, if the safety device 502 does not operate in safety master mode, the device 502 will receive the pulsed safety signal from an upstream safety device via the single-wire communication channel and, if the safety device 502 is not in a safe state, relay the pulse signal to the next downstream device on the safety circuit. In one or more embodiments, the safety master mode component 504 can switch the SWS+ safety device to safety master mode in response to detecting the presence of a terminator on the device's single-wire safety channel input terminal.

The pulse generating component 506 can be configured to generate the pulse pattern (e.g., pulse signal 302 of FIG. 3 or another pattern) and output the pulse pattern on the device's single-wire safety channel output terminal if the device 502 is operating in safety master mode. The device addressing component 508 can be configured to set an address for the safety device 502, and to report this address to other devices on the safety circuit via messages sent over the single-wire communication channel. The safe state detection component 510 can be configured to determine whether the safety device 502 is in its safe state. The conditions for identifying the safe state of the SWS+ safety device depend on the type of safety device. For example, a door-mounted reed switch is considered to be in its safe state when the switch is not in proximity to its corresponding magnet, indicating that the safety door on which the switch is mounted is opened. In another example, a light curtain is considered to be in its safe state when objects are detected between the light curtain's transmitter and receiver photo-arrays.

Pulse detection component 512 can be configured to identify presence of the defined pulse pattern on the device's single-wire safety channel input terminal. The safety signal relaying component 514 can be configured to relay the pulsed safety signal from the single-wire safety channel input terminal to a single-wire communication output terminal for transmission to the next downstream device if certain defined conditions are satisfied. The defined conditions can include at least detection of a valid pulse pattern on the safety signal received at the safety input terminal (as determined by the pulse detection component 512), and verification that the SWS+ safety device is not in its safe state (as determined by the safe state detection component 510).

Status word control component 516 can be configured to set status bits and words based on detected statuses of the SWS+ safety device, and to send the status bits and words to other devices on the safety circuit via the single-wire communication channel. Single-wire communication component 518 can be configured to coordinate bi-directional communication on the single-wire communication channel for safety devices that utilize single-wire communication. Message processing component 520 can be configured to process input messages received on either the single-wire safety channel input terminal or the single-wire safety channel output terminal, and to send output messages on either the input or output terminal. As will be described in more detail herein, input messages received on the input or output terminal via the single-wire channel can include, but are not limited to, requests to provide device status or event information, requests for the safety device's signature, enumeration messages, or other such input messages. Output messages can include, but are not limited to, response messages including the safety device's signature or device information, enumeration messages, device presence messages, relayed requests for another device's information, or other such messages.

Counter component 522 can be configured to periodically increment a counter value at a defined rate. The one or more processors 524 can perform one or more of the functions described herein with reference to the systems and/or methods disclosed. Memory 526 can be a computer-readable storage medium storing computer-executable instructions and/or information for performing the functions described herein with reference to the systems and/or methods disclosed.

Figure 6:
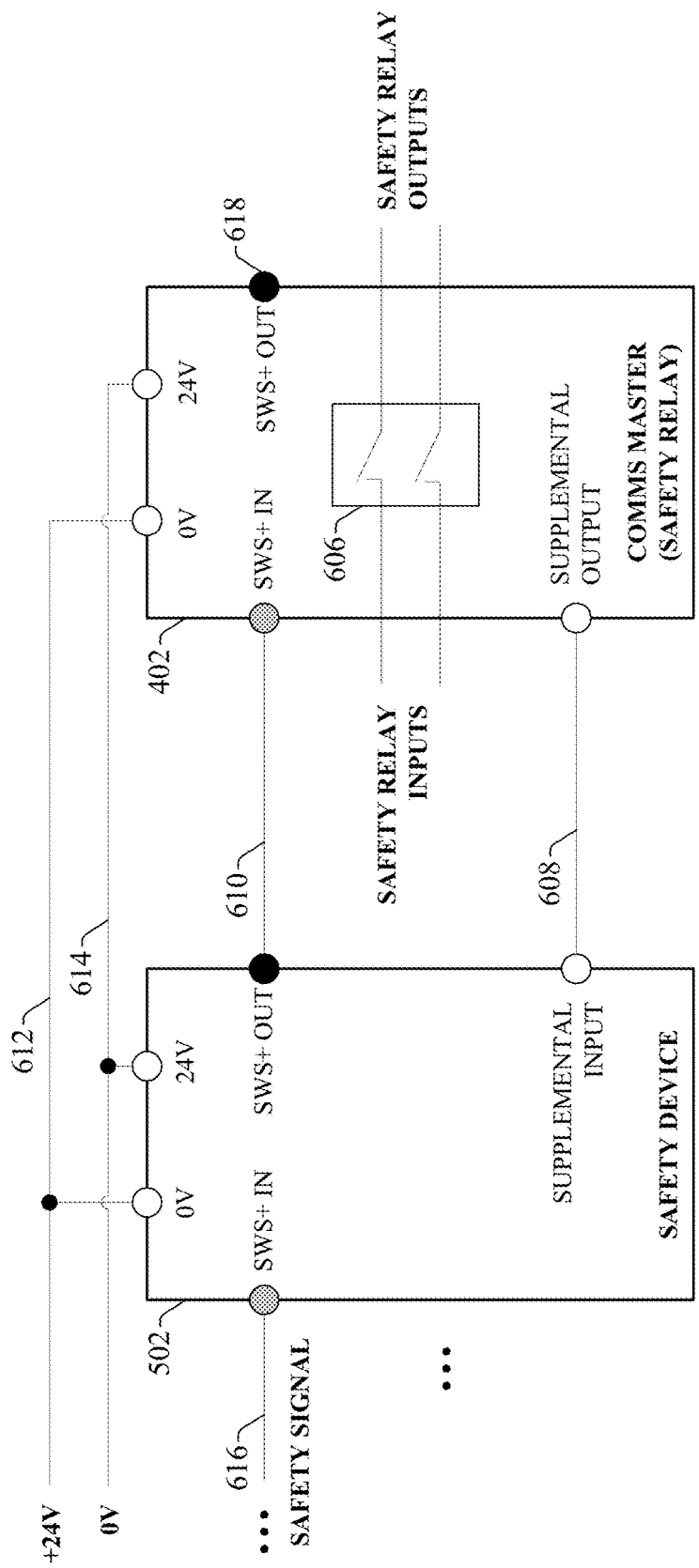
FIG. 6 is an example wiring schematic illustrating connections between a safety device and a comms master.

FIG. 6 is an example wiring schematic illustrating connections between a safety device and a comms master. In this example, safety device 502 includes terminals for 0 V and 24 VDC power, an SWS+ INPUT terminal, and an SWS+ OUTPUT terminal. During normal operation (SWS mode), the SWS+ INPUT terminal receives the pulsed safety signal from an upstream safety device on line 616, and the SWS+ OUTPUT terminal sends the safety signal to the next downstream device on line 610 (in the illustrated example, the next downstream device is the comms master 402; in the present disclosure, the terms "upstream" and "downstream" are relative to the direction of the pulsed safety signal from the safety master to the comms master). Safety device 502 will only send the pulse signal out on the SWS+ OUTPUT terminal if the valid pulse pattern is present on the SWS+ INPUT terminal and the safety device 502 is in the safe state. During diagnostic or configuration mode, safety device 502 uses the SWS+ INPUT and SWS+ OUTPUT terminals to exchange configuration or diagnostic messages with adjacent devices over lines 616 and 610 (the single-wire channel) in a bi-directional manner, as will be described in more detail herein.

FIG. 6 depicts safety device 502 as being wired for normal operation, whereby the safety device 502 resides between two other devices on the safety circuit. However, if safety device 502 is the last device on the safety circuit, such that there are no other upstream devices from which to receive the safety signal, a terminator can be connected to the SWS+ INPUT terminal. When this terminator is detected on the SWS+ INPUT terminal, safety device 502 is configured to operate in safety master mode, whereby the safety device generates the pulsed safety signal for the safety circuit, as will be described in more detail herein.

Comms master 402 includes terminals for 0 V and 24 VDC power, an SWS+ INPUT terminal for receiving the pulse signal on line 610, and an SWS+ OUTPUT terminal 618 for sending the pulse signal to another device (e.g., an expansion relay module or other device). Since the comms master 402 is typically a safety relay configured to comply with the single-wire communication protocol described herein, the comms master 402 also includes one or more safety contacts 606 for controlling application of machine power to one or more industrial machines or devices.

In some embodiments, comms master 402 may also include a SUPPLEMENTAL OUTPUT terminal for sending supplemental messages to safety devices on the safety circuit on a dedicated line 608 that is separate from the SWS channel. These messages can be received via SUPPLEMENTAL INPUT terminal on safety device 502. For example, comms master 402 may use the SUPPLEMENTAL OUTPUT terminal to send lock commands to safety devices that have integrated mechanical locks; e.g., remotely actuated door locks that include proximity switches to determine when the door is in the closed position. In such scenarios, the comms master can be programmed to actuate the locks in response to defined conditions to prevent the doors from being opened during dangerous operations. In another example, the comms master 402 may be configured to output a signal on the SUPPLEMENTAL OUTPUT terminal that, when received by the safety input devices, forces the safety input devices to switch from operational mode to the safe state (configuration or diagnostic mode).

Figure 7:
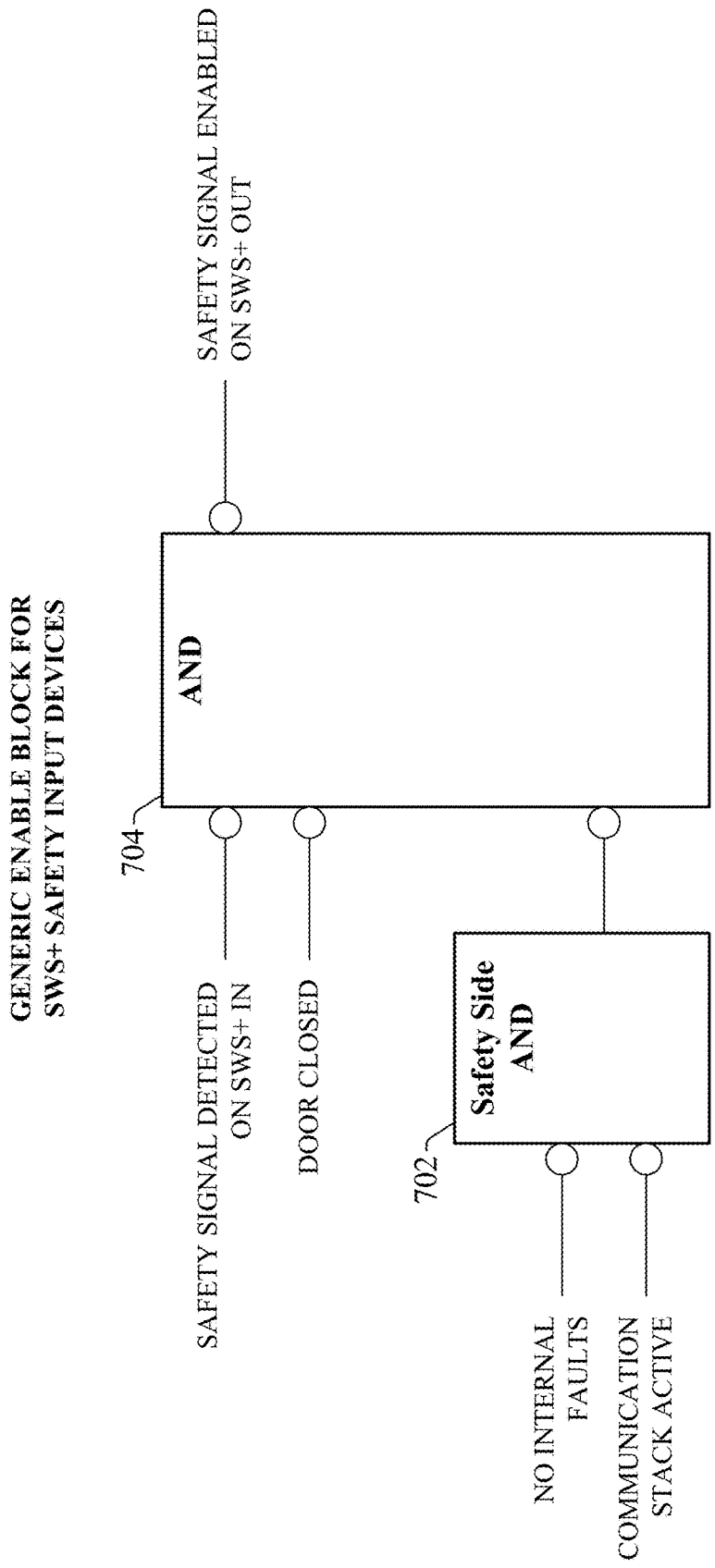
FIG. 7 is an example logic diagram illustrating enable conditions for an SWS+ OUTPUT terminal of a single-wire safety input device.

FIG. 7 is an example logic diagram illustrating the enable conditions for outputting the safety signal on the SWS+ OUTPUT terminal of safety device 502. The illustrated logic diagram can be implemented, for example, by the safety signal relaying component 514 illustrated in FIG. 5. In this example, the safety device is assumed to be a safety door switch that uses a proximity switch or reed switch to determine when a safety door or gate is in the closed position. AND block 704 determines whether the safety signal is detected on the safety device's SWS+ INPUT terminal, and whether the safety device registers its safety function is valid (in this example, the safe state is active when the door is closed) and whether the SUPPLEMENTAL OUTPUT is requesting the device to be in the safe state. The safety side AND block 702 determines whether any internal device faults are active, and whether the device's communication stack has become active. If no (a) internal faults are detected, (b) the communication stack is active, (c) the door is closed, (d) the SUPPLEMENTAL OUTPUT is not requesting a safe state, and (e) the safety signal is detected on the SWS+ INPUT terminal, the safety device enables the safety signal on the SWS+ OUTPUT terminal, thereby passing the received pulsed safety signal to the next sub-link of the single-wire safety channel.

Figure 8:
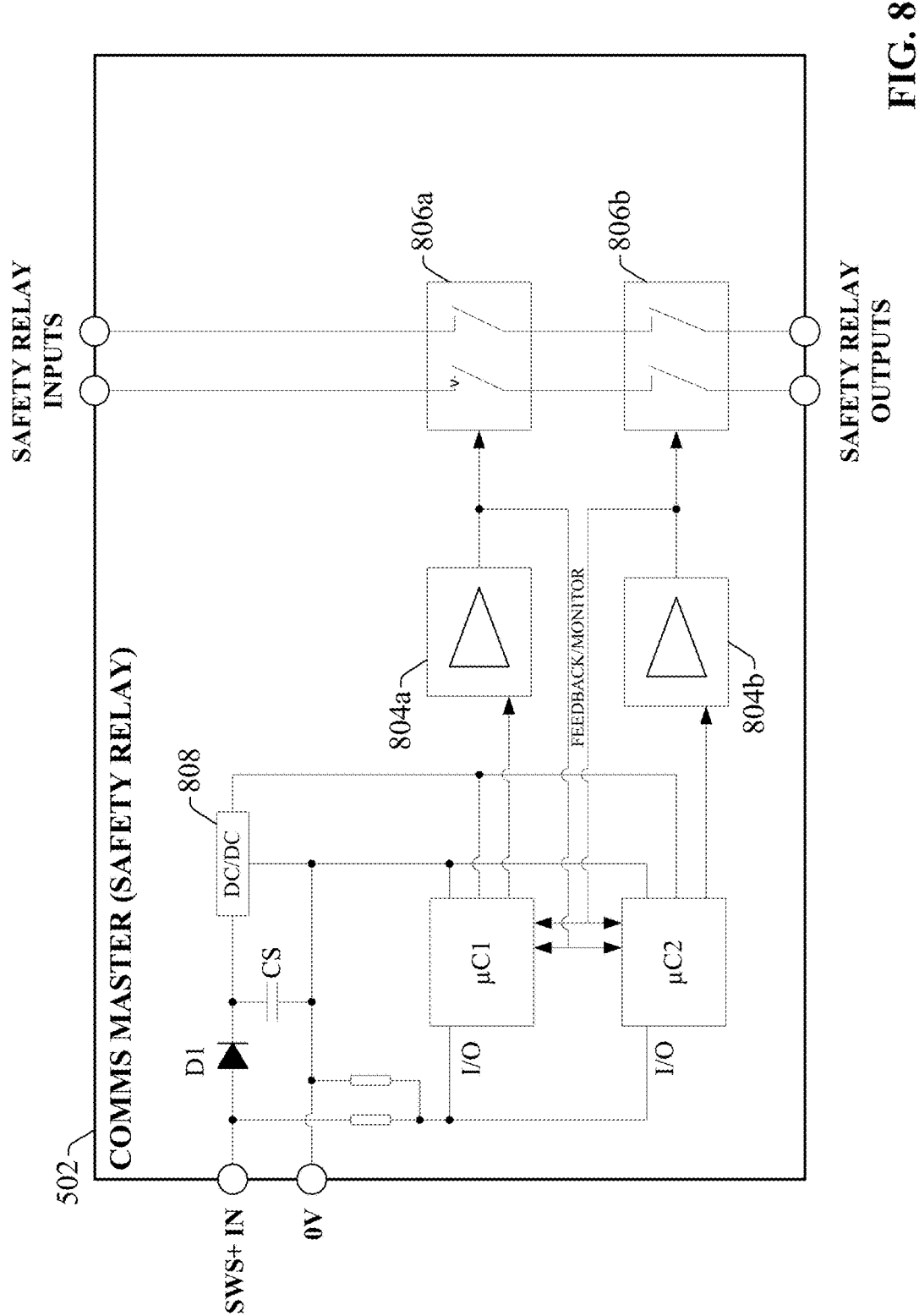
FIG. 8 is an example generalized electrical schematic that can be used to confirm receipt of a defined pulse signal on an SWS+ INPUT terminal of a comms master device.

FIG. 8 is an example generalized electrical schematic that can be used to confirm receipt of the defined pulse pattern on the SWS+ INPUT terminal of the comms master 402. The example schematic can reliably verify the pulse signal using independent redundant verification. For clarity, the circuitry used to control diagnostic and configuration message communication is omitted from FIG. 8, and the illustrated schematic only includes elements for confirming receipt of the defined pulse signal. It is to be appreciated that the schematic depicted in FIG. 8 is only intended to be exemplary, and that any suitable electrical design for controlling safety relay outputs based on presence or absence of a specified pulse pattern is within the scope of one or more embodiments of this disclosure.

The comms master 402 receives the pulsed safety signal via the SWS+ INPUT terminal, and splits the received signal between a power storage capacitor CS (e.g., an electrolyte capacitor) and two microcontrollers μC1 and μC2. A DC/DC converter 808 connected to the storage capacitor CS generates a supply power having a supply voltage of 5 V from the input 24 V pulse train signal. The 0 V terminal receives the 0 V ground potential. While all safety input devices on the safety circuit are in their respective safe states, comms master 402 is provided with the supply voltage via the diode D1, the storing capacitor CS and the DC/DC converter 808, representing the necessary operating voltage. When powered by the output of the DC/DC converter 808, the microcontrollers μC1 and μC2 are activated. If these microprocessors now additionally detect a valid pulse code at their I/O terminals, the driver units 804a and 804b are controlled to trigger the relay pairs 806a and 806b for providing a switched-on status of the safety relay outputs. Consequently, SWS+ INPUT must receive a voltage different from 0 V, which additionally must have a valid pulse pattern in order to cause the comms master 402 to output a valid output signal.

With this safety device topology, it is possible to fulfill the requirements of category 4 of the safety standards using only a single-channel connection. The high safety category is achieved due to the predetermined pulse pattern conveyed on the signal and the two-channel evaluation of this signal using both microprocessors. Furthermore, by feeding back the output signals of the driver units 804a and 804b to both microprocessors in a parallel way, a plausibility check can be performed to ensure fault-free operation of the microprocessors.

When any of the safety input devices on the safety circuit go to the safe state (e.g., a light curtain is broken, an emergency stop pushbutton is pressed, etc.), the pulse signal is no longer received at the SWS+ INPUT terminal of the comms master 402, causing relay pairs 806a and 806b to open, thereby disconnecting power from the industrial devices fed by the safety relay outputs. Opening of the safety relay outputs is triggered when either of two criteria is met—when one or both of microcontrollers μC1 and μC2 do not detect a valid pulse pattern on their input terminals, or when the microcontrollers do not receive a supply voltage from DC/DC converter 808. Thus, a failure of one of the microcontrollers, one of the driver units 804a and 804b, or one of the relay pairs 806a and 806b does not prevent safe operation of the comms master 402.

FIGS. 9A-9D are block diagrams illustrating safety and diagnostic modes of an example single-wire safety circuit according to one or more embodiments. As shown in FIG. 9A, example single-wire safety circuit 902 comprises a comms master 906 and five safety devices 904a-904e, where safety device 904a operates in safety master mode and safety devices 904b-904e operate in normal mode. Safety devices 904a-904e can comprise any types of safety input devices compatible with the single-wire communication protocol, including but not limited to safety door switches, light curtains, photoelectric sensors, laser scanners, safety mats, emergency stop pushbuttons or pull cord devices, or other such safety devices. The SWS+ OUTPUT terminal of each device on the safety circuit (depicted in black in FIGS. 9A-9D) is wired to the SWS+ INPUT terminal (in grey) of the next downstream device. Safety device 904a, which is the last device on the safety circuit, is fitted with a terminator 910 on its SWS+ INPUT terminal. As the last device, safety device 904a will operate as the safety master for the single-wire safety circuit by generating the pulsed safety signal 908 to be placed on the safety channel. The safety master device (safety device 904a) and the comms master 906 act as anchors for the single-wire safety circuit.

After installation of the safety devices and prior to normal operation, the devices on the safety circuit enter a start-up mode, during which the devices comprising the safety circuit perform auto-discover and device addressing (enumeration) operations. Start up mode begins with power up, during which power is applied to the safety input devices 904a-904e and the comms master 906 comprising the single-wire safety circuit. As the devices on the circuit are powered up, the system enters an auto-detect phase, during which each device initializes, identifies adjacent devices on the circuit, and reports its presence to the adjacent devices. Communication between the devices is performed via the single-wire channel using a suitable messaging protocol. For example, devices can report their presence to adjacent devices by exchanging "I am here" (IAH) messages over the single-wire channel. When two adjacent devices have detected each other, a sub-link phase is entered, during which a communication sub-link between the two adjacent devices is established. In some embodiments, establishment of sub-links between adjacent devices can be performed asynchronously, and it is not necessary for the comms master 906 to be powered up before two adjacent safety input devices can establish a sub-link with one another. By allowing adjacent devices to establish sub-links asynchronously as they are powered up and identified, regardless of the state of the comms master 906, the total SWS+ link (comprising all sub-links between adjacent devices) can be established quickly.

When at least the sub-link between the comms master 906 and its adjacent safety input device 904e has been established, the system enters a link enumeration phase, during which the comms master 906 addresses each device on the system; e.g., by exchanging "I am enumerating" (IAE) messages via the single-wire channel. The comms master may begin enumerating devices before all sub-links on the circuit have been established, provided there is a path of established sub-links between the comms master and at least one safety input device. After the link enumeration phase, the system enters a link identification phase, during which the comms master 906 collects device information from each safety input device 904a-904e on the circuit, including but not limited to device type or model information, vendor information, hardware and software revision information, device data signatures, etc. For example, the comms master 906 can send "get device information" (GDI) messages directed to each individual safety input device over the single wire channel. Upon receipt of the GDI message, each safety input device can respond with a GDI response message containing the requested device information. The comms master 906 receives this device information via the single-wire channel and records the information on local memory.

Once the auto-detect, sub-link, link enumeration, and link identification phases described above have completed, the system can enter normal operation (run mode). During a diagnostic mode, the system determines whether the pulsed safety signal 908 is present at the comms master 906, indicating that all safety input devices 904a-904e on the circuit are in their respective operation states. If the safety signal is detected ("safety signal on"), the system enters an operational mode, during which the comms master 906 allows its relays (e.g., relay pairs 806a and 806b of FIG. 8) to be closed, providing power to the industrial machines and devices connected to the safety relay outputs. If the safety signal is no longer detected at the comms master 906 ("safety signal off"), indicating that one or more of the safety input devices 904a-904e has entered the safe state, the system transitions back to diagnostic mode, during which the comms master 906 begins polling the safety input devices 904a-904e individually to determine which device has been switched and to collect other diagnostic information, as will be described in more detail herein. Message exchange between devices during diagnostic mode is performed over the same single-wire communication channel over which the pulsed safety signal is sent. If a safety device on the circuit is reset (e.g., power is cycled on the device), the auto-detect, sub-link, link enumeration, and link identification phases are repeated for that device.

As safety master, safety device 904a generates the pulsed safety signal 908 that is placed on the single-wire safety channel. During operation mode, during which all safety devices 904a-904e are in their respective operational states, pulsed safety signal 908 is relayed along the single-wire channel by the respective safety devices and received at the SWS+ INPUT terminal of comms master 906. Each safety device that receives the pulsed safety signal 908 on its SWS+ INPUT terminal during safety mode verifies that the received pulse pattern matches the defined pulse pattern (e.g., pulse signal 302 or another defined pulse pattern). In accordance with the enable block illustrated in FIG. 7, each safety device outputs the pulsed safety signal on its SWS+ OUTPUT terminal if (a) the pulse pattern is confirmed to be the correct pulse pattern, (b) the safety function is valid (e.g., door closed, emergency stop pushbutton disengaged, light curtain unbroken, etc.), (c) there are no internal faults on the safety device, and (d) the communication stack for the safety device is active. The pulsed safety signal 908 is thus relayed through the safety devices 904a-904e via the single-wire channel to the SWS+ INPUT terminal of the comms master 906.

Comms master 906 detects and verifies that the pulse pattern received on the safety signal matches the defined pulse pattern (e.g., pulse signal 302 or another defined pulse pattern). As long as the defined pulse pattern is recognized on its SWS+ INPUT terminal, comms master 906 allows its safety contactors to switch to the closed state, providing power to the industrial machines and/or devices connected to its safety relay outputs (operational mode).

FIG. 9B illustrates a scenario in which safety device 904d—corresponding to a door safety switch—switches to its unsafe state (e.g., the corresponding safety door has been opened). Upon switching to the safe state, safety device 904 stops relaying the pulsed safety signal to the next downstream device on the safety circuit (safety device 904e), preventing the pulsed safety signal from reaching the comms master 906. Upon detecting loss of the safety signal, comms master 906 opens its safety contactors and isolates power from the connected industrial machines and/or devices (safe state). In addition to blocking the safety signal, safety device 904d also sets a "last device" (LastDev) flag indicating that it is the last device on the safety circuit capable of receiving the safety signal from the safety master 904a. The safety device also performs other preliminary functions relating to time-stamping of the event, which will be described in more detail herein.

Upon detecting loss of the safety signal, comms master 906 initiates diagnostic mode and begins collecting information from the safety devices. The comms master can retrieve data by addressing specific devices starting with device (01) or can send a broadcast address of (FF) to retrieve data from all devices. The following will described addressing specific devices. As shown in FIG. 9C, comms master 906 begins by sending a "get device diagnostics" (GDD) message to address 01 (safety device 904e) via the single-wire channel (e.g., by outputting the GDD message on its SWS+ INPUT terminal). The GDD message (labeled "1" in FIG. 9C) includes the address (01) for which status information is requested. Upon receiving the GDD message on its SWS+ OUTPUT terminal and determining that the address contained in the GDD message corresponds to its own address, safety device 904e responds by sending a GDD response message (labeled "2" in FIG. 9C) comprising its address number (01) and diagnostic status data (DATA), which also includes information that will be used to generate a time-stamp for the event, as will be described in more detail below. Safety device 904e outputs this DIAG response message on its SWS+ OUTPUT terminal, sending the response via the single-wire channel.

The diagnostic status data sent by the safety device can comprise any suitable diagnostic information available on the safety device, including at least the value of the safety device's LastDev flag. For example, the diagnostic data may comprise a pre-formatted status word divided into pre-defined status bits and registers, where the values of the bits and registers are set by status word control component 516. Since safety device 904 is still in its safe state, its LastDev flag has not been set. Accordingly, the GDD response message from safety device 904e reports a value of LastDev=FALSE. The GDD response message can also include other status and fault information for the safety device in addition to the LastDev flag. This can include both error codes that are common to all SWS safety devices as well as device-specific status and fault information. Example device-specific status information that can be included in the GDD response message can include, but is not limited to, door open and closed status (for door safety switches), beam on and off statuses and beam strength warnings (for light curtains), button on and off statuses (for emergency stop pushbuttons and pull-cords), or other such information. Additionally, if an event has occurred at the safety input device (e.g., a switching event that caused the device to prevent passage of the pulsed safety signal, or a non-switching event that did not affect the Safety On status of the device), the GDD response message can include a counter value specifying the value of the device's internal counter at the time the event occurred. As will be described in more detail below, the comms master can use this counter value to generate a time-stamp for the event.

Upon receiving this GDD response message and determining that safety device 904e is not the last available device on the circuit (based on the value of the LastDev flag), comms master 906 next sends a GDD message to address 02 (corresponding to safety device 904d), as shown in FIG. 9D. Safety device 904e receives this GDD message on its SWS+ OUTPUT terminal and, in response to determining that the address contained in the message does not match its own address, relays the GDD message to the next upstream device (safety device 904d) by outputting the GDD message on its SWS+ INPUT terminal. Safety device 904d responds with a response GDD message including its address (02) and diagnostic data including at least the value of its LastDev flag (LastDev=TRUE). This GDD response message is relayed to comms master 906 via safety device 904e, informing the comms master 906 that the safety device addressed 02 is the last accessible device on the safety circuit. Based on this information, comms master 906 determines that safety device 904d is in its unsafe state, and can report this information to the user (e.g., via a display indication, by sending a notification to a mobile device of a specified user, etc.). In some embodiments, comms master 906 can also retrieve information about the identified safety device from previously registered device identification information and provide this information to the user as well. For example, based on the registered device information, comms master 906 knows that the safety device corresponding to address 02 is a safety door switch, and therefore the unsafe state corresponds to a detected door open status. The comms master 906 can therefore generate a notification that the safe state is due to the safety door corresponding to safety input device 02 being open. The comms master will also generate a time-stamp corresponding to the time at which the detected switching event occurred using techniques to be described in more detail below.

Once the last device capable of receiving the safety signal from the safety master 904a is found (that is, once the device whose LastDev flag is set to TRUE is identified), the comms master 906 will then send the next GDD message request. The comms master 906 will only send GDD messages to devices up to the device that is blocking the safety signal, mitigating unnecessary polling of active devices between the safety master 904a and the safety device responsible for blocking the safety signal.

While the safe stat of the comms master is is due to safety device 904d being in the safe state, safety master 904a continues to send the pulsed safety signal along the single-wire channel. However, the safety signal will only be relayed as far as the SWS+ INPUT terminal of safety device 904d. Upon returning to its safe state (when the safety door corresponding to safety device 904d has been closed), safety device 904d will detect the pulsed safety signal on its SWS+ INPUT terminal and resume relaying the safety signal. If device 904e has not entered the safe state, it too will relay the pulsed signal to the comms master 906. Subsequently, comms master 906 detects the safety signal on its SWS+ INPUT terminal and switches operational mode back to ON, allowing the safety contactors to be closed and power to be provided on the safety relay outputs.

FIGS. 10A-10F are block diagrams illustrating how messaging is performed in a scenario in which multiple safety devices switch to their safe state due to their doors being opened. Initially, the safety circuit is operating in operational mode, wherein all safety devices 904a-904e are in their respective operational states and are relaying the pulsed safety signal 908 to comms master 906, as shown in FIG. 10A. The safety door corresponding to safety device 904d is then opened, followed by the safety door corresponding to safety device 904c, as shown in FIG. 10B. When safety device 904d switches to its safe state, it initially sets its LastDev flag to TRUE, as described above in the previous example. However, when safety device 904c subsequently switches to its safe state and ceases relaying the safety signal, safety device 904d detects the loss of the safety signal on its SWS+ INPUT terminal and resets its LastDev flag to FALSE. Meanwhile, safety device 904c sets its LastDev flag to TRUE. In general, a given safety device sets its LastDev flag to TRUE if (a) the safety device is in its safe state, and (b) if the safety device still detects the safety signal on its SWS+ INPUT terminal. When these two conditions are true, the safety device becomes aware that it is the last device capable of receiving the safety signal and sets its LastDev flag to TRUE.

When the comms master switches from operational to the safe state in response to safety device 904d switching to its safe state, comms master 906 begins polling the devices for diagnostic information, by sending either a broadcast message or by asking each device individually in a round robin manner for information. The illustrated example assumes that the comms master polls the devices individually; however, the broadcasting technique described above may also be used. Safety device 904e reports a value of LastDev=0, so comms master 906 waits for more responses, as shown in FIG. 10D. Although safety device 904d (corresponding to address 02) is in its safe state, it is not the last device capable of receiving the safety signal generated by safety master 904a, and therefore reports LastDev=0. Accordingly, comms master 906 proceeds to poll address 03, which reports LastDev=1, as shown in FIG. 10E. At this stage, comms master 906 reports the statuses of safety devices 904c, 904d, and 904e (e.g., doors open or doors closed).

Upon determining that safety device 904c is the stopping point for the safety signal, comms master 906 will continue to send DIAG requests to devices 904e, 904d, and 904c. If devices 904a or 904b enter the safe state, they too will begin to respond to the requests and the LastDev=TRUE indicator will move to the safety device closest to the safety master with a door open.

When the safety door corresponding to safety device 904c is closed, as shown in FIG. 10F, safety device 904c replies to the next diagnostic request with its Safety Signal Enable SSE=TRUE. Safety devices 904d and 904e relay this message untouched to the comms master. In addition, safety device 904d sends a confirmation message back to safety device 904c acknowledging receipt of the SSE=TRUE bit. Safety device 904c will then resume relaying the safety signal. Meanwhile, since safety device 904d is still in its safe state (door open) but now detects the presence of the safety signal on its SWS+ INPUT terminal, that device sets its LastDev flag to TRUE. Consequently, upon receipt of the next GDD message directed to address 02, safety device 904 sends a GDD response message that includes a value of LastDev=TRUE, and will not attempt to relay the message upstream. The comms master 906 continues to send GDD requests until all safety devices have sent their SSE=TRUE bits in their diagnostic message responses, been confirmed, and the safety signal is relayed to the comms master.

The foregoing examples describe a number of message types (IAH, IAE, GDI, GDD, etc.) that can be exchanged between SWS+ safety devices via the single-wire safety channel. Some embodiments of the SWS safety devices described herein may support additional types of messaging. For example, in one or more embodiments, the comms master may be configured to send remote restart commands to selected devices via the single-wire channel. These remote restart commands may include the address of the safety device to be restarted, such that when the targeted device receives the command on its SWS+ OUTPUT terminal and verifies the matching address, the safety device will initiate a restart sequence.

As described in the foregoing examples, the safety input device designated as the safety master modulates the safety signal according to a defined pulse pattern (e.g., the pulse pattern depicted in FIG. 3), and this safety signal is relayed from the safety master to the comms master over the single-wire channel. In some embodiments, one or more additional pulse patterns can be defined for use by the safety system devices for other purposes. For example, two different pulse patterns may be defined to convey respective two different types of safety states (e.g., a "doors closed" state and a "doors locked" state). The comms master can be configured to recognize which of the defined patterns is present on the single-wire channel and operate in accordance with the particular safe state corresponding to the detected pulse pattern (which may depend on user-defined programming downloaded to the comms master). For example, the comms master may be programmed to only enable a defined subset of its safety relay outputs if a first defined pattern is detected (e.g., a pattern corresponding to a "doors closed but unlocked" state), and to enable the remaining safety relay outputs if the second defined pattern is detected (corresponding to a "doors closed and locked" state).

Embodiments of the single-wire safety architecture described above can be configured to generate time-stamps for events detected on the safety circuit. These events can include switching events, which cause the safety input device to switch between Safety On and Safety Off modes (e.g., door open or close events, emergency stop button events, light curtain broken or resent events, etc.), as well as non-switching events that do not result in a switching of the safety mode of a safety input device. These two different types of events can be stored in separate event first-in-first-out (FIFO) stacks in the safety device while awaiting retrieval during a GDD message exchange with the comms master. The time-stamping protocol used by the single-wire safety architecture can mark when the event occurred relative to a real-time system clock located outside of the single-wire safety system (e.g., outside of the comms master and safety input devices). Since the time resolution required for such events is relatively low (e.g., tens of milliseconds rather than microseconds), the time-stamps can be generated using a light-weight time-stamping and synchronization protocol that uses simple arithmetic and autonomous counters or timers.

Figure 11:
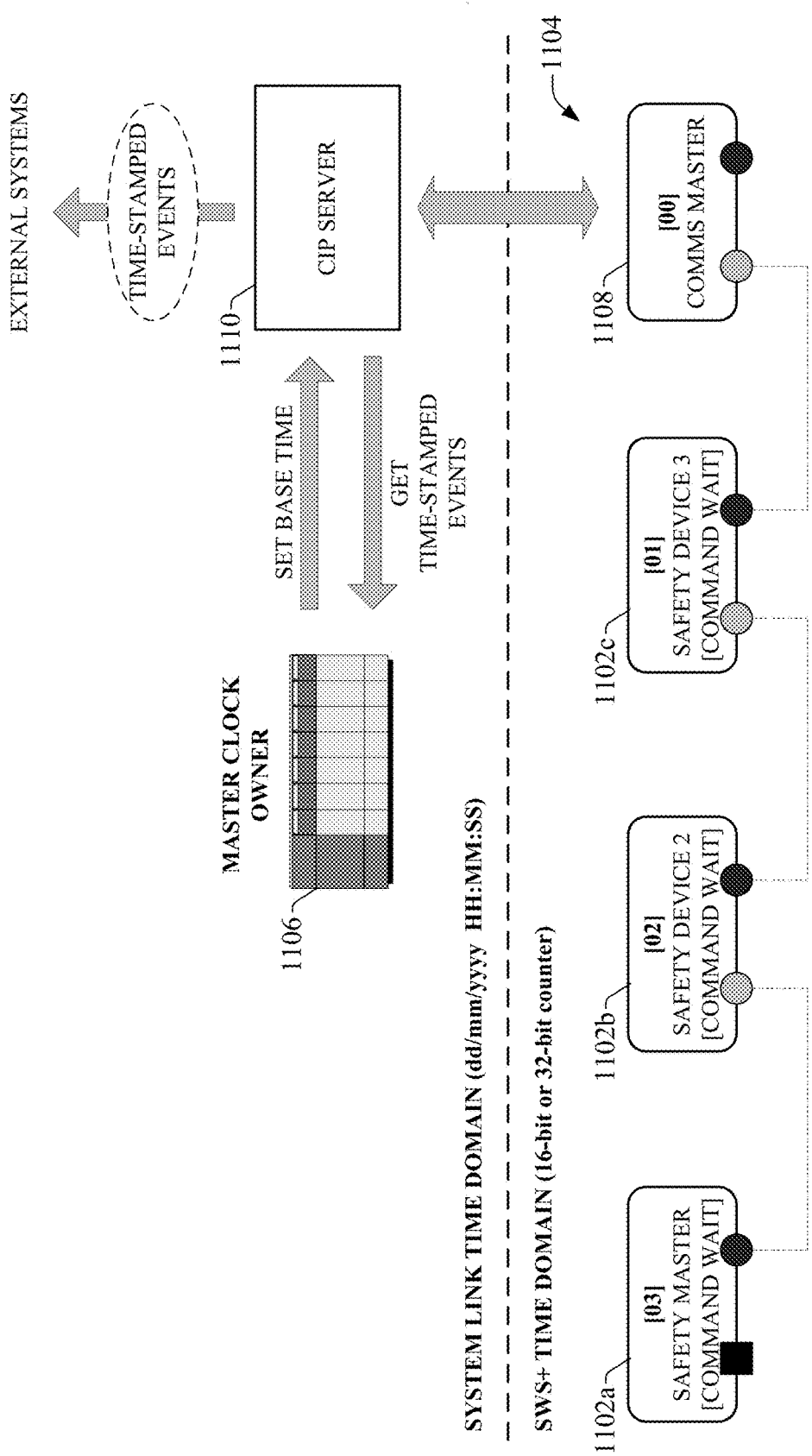
FIG. 11 is a diagram illustrating components that participate in the time-stamp protocol.

FIG. 11 is a diagram illustrating components that participate in the time-stamp protocol according to one or more embodiments. As described in previous examples, a single-wire safety circuit 1104 can comprise a comms master 1108 and safety devices 1102a-1102c (in this example, only three safety input devices are shown). A CIP server 1110 is configured to serve information to higher-level devices as requested. The CIP server 1110 can also query the comms master 1108 for information relating to the single-wire safety link. With regard to time-stamping, the safety devices 1102a-1102c are responsible for identifying occurrences of real-world events (e.g., switching and non-switching events), determining counter values of their internal counters at the times these events occurred, and making this event and counter information available to the comms master when requested. Comms master 1108—in addition to the functions described above—is responsible for collecting event information from the safety devices 1102a-1102c on the single-wire safety circuit, time-stamping the event in an SWS+ time domain, and making the time-stamped event data available to the CIP server 1110, which can convert the time-stamps to a system link time domain (these domains are described in more detail below). The CIP server 1110 can store the time-stamped event data for later viewing or retrieval, or push the event data to external systems. Although CIP server 1110 is depicted as a separate server device in FIG. 11, the functionality of the CIP server 1110 can be integrated in the comms master 1108 in one or more embodiments.

A master clock owner (MCO) 1106 serves as the keeper of the master clock. In this example, the MCO is an industrial controller (e.g., a programmable logic controller (PLC) or other type of industrial controller) that controls at least a portion of an industrial system or process associated with the safety circuit 1104. For example, the PLC may control an industrial machine or workcell for which safety circuit 1104 provides safety functionality and risk mitigation. In some embodiments, the MCO is not required unless real-time time-stamping is required (that is, time-stamping relative to a master clock). If the MCO 1106 is not used, time-stamps will indicate timings of events relative to the other participants on the single-wire safety link.

The single-wire safety architecture depicted in FIG. 11 uses two time domains for time-stamping of events. A system time domain comprises the time domain shared by the MCO 1106 and the CIP server 1110, the clocks of which are synchronized with each other within a specified degree of precision. The time format for the system time domain can be any standard date/time format (e.g., dd/mm/yyyy HH:MM:SS). An SWS+ link time domain is used by the devices on the single-wire safety circuit 1104 (comms master 1108 and safety devices 1102a-1102c). Typically, the SWS+ link time domain will be relative to the comms master 1108. The format for the SWS+ link time domain can be, for example, a 16-bit or 32-bit counter value corresponding to individual counters maintained by each device on the single-wire safety circuit. The counters can be configured to increment periodically and autonomously in each device on the circuit at a defined frequency (e.g., controlled by counter components 414 and 522 depicted in FIGS. 4 and 5). The resolution of the time-stamps is a function of the size of the counter and the incrementing frequency (e.g., a 16-bit counter may provide a resolution of around one second at a given incrementing frequency, while a 32-bit counter may provide a resolution in the 30-50 millisecond range—or higher—at the given incrementing frequency).

In general, device clocks can drift out of sync due to variations in crystal oscillations across the devices. If two different device clocks oscillate at slightly different frequencies, the difference between the two clocks becomes greater over time. Since time-stamps for events on the safety circuit only require a resolution in the range of tens of milliseconds, highly precise clock synchronization is not necessary, and therefore clock synchronization techniques can be kept simple. The time-stamping protocol described herein considers two drift zones—a clock drift sync zone between the master clock owner 1106 and the CIP server 1110, and a clock synch "don't care" zone between the CIP server and the safety master 1102a (the last safety input device on the safety circuit 1104).

Figure 12:
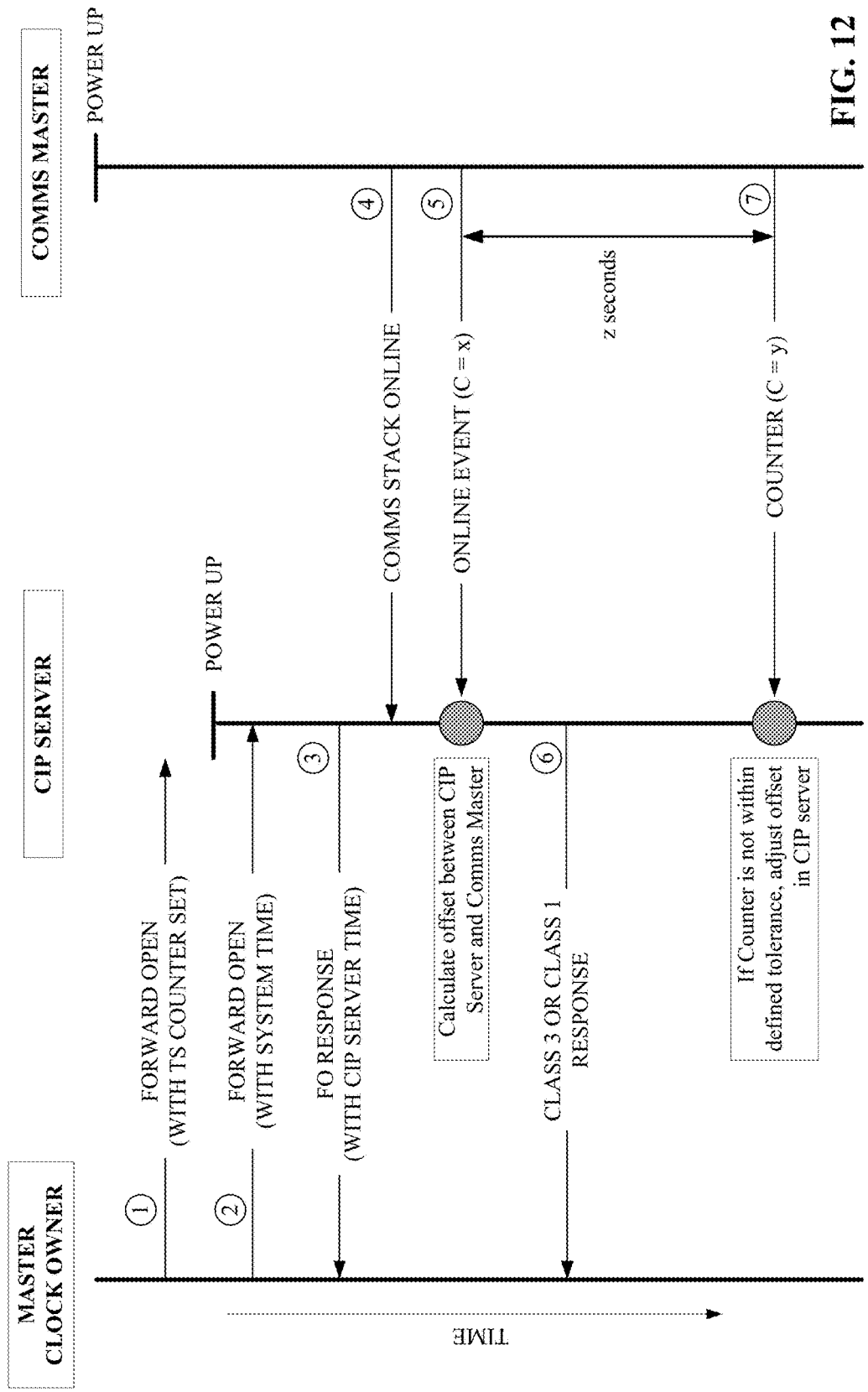
FIG. 12 is a timing diagram illustrating an example initialization sequence for the system time domain.

In the clock drift sync zone between the master clock owner 1106 and the CIP server 1110, the time must be kept in sync with the system within a degree of tolerance. To this end, the CIP server 1110 will accommodate for drift adjustments in order to reduce drift over time. FIG. 12 is a timing diagram illustrating an example initialization sequence for the system time domain. It is to be appreciated that the sequence depicted in FIG. 12 is only intended to be exemplary, and the sequence may be varied without departing from the scope of one or more embodiments of this disclosure. In this example, the comms master 1108 powers up prior to the CIP server 1110. Initially, the master clock owner 1106 sends a command to the CIP server to open a connection (message 1). This may comprise, for example, an Ethernet/IP class 1 forward open command; however, other protocols are within the scope of one or more embodiments of this disclosure. After the CIP server 1110 powers up, the master clock owner 1106 sends another forward open command including the current system time read from the clock maintained on the master clock owner 1006 (message 2). The CIP server receives this forward open message, sets its clock to match the system time included in the open message from the master clock owner (optionally adding a small offset time corresponding to a transmission latency from the master clock owner to the CIP server), and responds with a forward open response message (message 3) that includes the CIP server time read from the CIP server's internal clock.

After the comms master 1108 has powered up and has initialized its communications stack, the comms master 1108 sends a message to the CIP server 1110 reporting that its communications stack is online (message 4). Some time after this message is sent, the comms master 1108 reads the current value of its internal counter (maintained by counter component 414) and sends a subsequent message (message 5) to the CIP server 1110 reporting this current value (counter=x). Upon receipt of the comms master's current counter value, the CIP server 1110 calculates an offset between the CIP server's current time (read from the internal clock) and the comm's master's counter value. The CIP server 1110 uses this offset value as a reference to correlate its clock time with the comms master's counter, so that CIP server counter values can be translated to master clock times. The CIP server 1110 may also send another response message (e.g., a class 3 or class 1 Ethernet/IP message) to the master clock owner 1106 (message 6) indicating that the comms master 1108 is online and reporting the offset value.

After this initial offset calculation, the comms master 1108 will report its current counter value in response to switching or non-switching events (as will be described in more detail below), allowing the CIP server to verify that the previously calculated offset is still sufficiently accurate for time-stamping purposes. That is, in addition to leveraging the counter value provided by the comms master for time-stamping purposes, the CIP server will verify that the counter value is within a defined tolerance of the originally calculated offset relative to the CIP server clock, and make any necessary adjustments to the offset upon determining that the new counter value is outside the tolerance. If no events occur for a defined period of time (e.g., z seconds), the comms master 1108 can read its current counter value and send a subsequent message (message 7) to the CIP server 1110 reporting this new counter value, which is sued by the CIP server 1110 to verify the offset. In this way, the offset is guaranteed to be checked and corrected at a minimum frequency even if no events are detected on the safety circuit.

In the clock synch "don't care" zone between the CIP server 1110 and the safety master 1102a, synchronization is not necessary for time-stamping of switching events, since switching events detected by the safety devices 1102a-1102c are reported to the CIP server 1110 immediately, and every time-stamp is relative to the last request from the comms master 1008.

The time-stamp calculation is now described in connection with FIG. 13, which is a timing diagram illustrating message exchanges between devices on the safety circuit in response to a switching event 1302 detected on a safety device on the safety circuit. In this example, a switching event (e.g., a door open or closed event, a light curtain broken or reset event, etc.) is detected on the third safety device from the comms master 1108, initiating the exchange of GDD messages as described above in connection with FIGS. 9A-10F. The respective internal counters of the comms master and the three safety devices have different count values at the beginning of this example scenario—the comms master initially has a count of 330, while the safety devices have counts of 100, 230, and 70, respectively. Counter synchronization between the devices on the safety circuit is not necessary, since the time-stamps will be generated relative to the comms master timing, as will be discussed below. In this example, the device counters all increment with a period of 1 ms.

Some time prior to the switching event 1302, the master clock owner will send a message to the CIP server (message 1) setting the current time (e.g., using a forward open command, as described above in connection with FIG. 12).

This synchronizes the time used in the system link time domain, and ensures that the event time-stamps are relative to the clock running on the master clock owner.

When event 1302 is detected at safety device 3, the device switches to Safety Off mode, records its current counter value (Count=120) in an internal register (EVT_READ_0) together with a record of the event in an event FIFO stack, blocks passage of the pulsed safety signal (or, if safety device 3 is the safety master, the safety device will cease generating the pulsed safety signal), and awaits receipt of a GDD message from the comms master requesting the safety device's diagnostic information. In response to detecting the loss of the pulsed safety signal on its SWS+ INPUT terminal, the comms master initiates diagnostic mode and begins sending GDD messages to collect diagnostic information from the safety devices in a round-robin manner via the single wire channel, as described above in connection with FIGS. 9A-10F. When sending the first GDD message to safety device 1 (message 2), the comms master records its current count value (Count=380) at the time the GDD message was sent in an internal register (CM_EVT_READ_0). Safety device 1 responds with a GDD response message (message 3), which is received at the comms master 20 ms later in this example (in FIG. 13, GDD query messages are labeled "RQ," while GDD response messages are labeled "RP"). This GDD response message can contain similar information to those described above in connection with FIGS. 9A-10F. Since safety device 1 is not the device currently in Safety Off mode and has no events stored in its event FIFO, that device does not report any recorded or calculated counter values.

Since safety device 1 reports its LastDev value as FALSE (since it is not the device in Safety Off mode), the comms master sends another GDD message directed to safety device 2 (message 4). The comms master discards the counter value previously saved in CM_EVT_READ_0, and replaces this older counter value with its current counter value corresponding to the time that this second GDD message is sent. Since this GDD message and its response from safety device 2 must be relayed through safety device, the GDD response message from safety device 2 (message 5) takes approximately twice as long to be seen at the SWS+ INPUT terminal of the comms master (40 ms between sending of the GDD message 4 and receiving the GDD response message 5).

Since the response message from safety device 2 also reports a LastDev value of FALSE, the comms master sends another GDD message directed to safety device 3 (message 6). The comms master also discards the counter value previously saved in CM_EVT_READ_0, and replaces this older counter value with its current counter value corresponding to the time that this third GDD message is sent (Count=560). Since safety device 3 is the device currently in Safety Off mode, the device processes the GDD message differently than safety devices 1 and 2. In particular, safety device 3 records its current count value at the time the GDD message was received from safety device 2 (count=330) in another register (EVT_READ_1), then calculates a Return Counter value C by determining the difference between the counter value at the time the GDD message (message 7) was received (count=330, stored in EVT_READ_1) and the counter value at the time the switching event was detected (count=120, stored in EVT_READ_0). This return counter value is placed in register EVT_ACTUAL:

$$\text{Return Counter }(C)=\text{EVT\_READ\_1}-\text{EVT\_READ\_0}=330-120=210\text{ ms}\rightarrow\text{EVT\_ACTUAL} \quad (1)$$

For increased accuracy, the safety device may also add half of the expected counter increments that will elapse during the turn-around time X between receipt of GDD message and sending of the GDD response message (message 8). However, if this turn-around time X is sufficiently small, this additional turn-around factor can be ignored The GDD response message from safety device 3 (message 8) specifies a LastDev value of TRUE (similar to previous examples) and includes the Return Count value C (210 ms). This value represents the time, in safety device 3 counter increments (in this example, 1 ms increments), between detection of the switching event and receipt of GDD message 7 from the comms master. This GDD response message is returned to the comms master over the single wire channel (via safety devices 1 and 2). The elapsed time between the sending of GDD message 6 and receipt of GDD response message 9 at the comms master is approximately 60 ms (three times the duration required for a similar exchange between the comms master and safety device 1). Upon receipt of this GDD response message, the comms master translates the Return Counter value C received from safety device 3 (representing a relative time duration measured in safety device 3 counter increments) to an absolute comms master counter value corresponding to the time at which the switching event occurred. In general, the comms master determines the counter value corresponding to the switching event by estimating the counter value corresponding to the time at which safety device 3 received the GDD message 7 (represented by line 1304), determining the elapsed number of counter increments Y between this time and the time of the event, and working backward to determine the absolute comms master counter value at the time the event was detected at safety device 3.

To determine the comms master counter value corresponding to event 1302, comms master first records its current counter value at the time GDD response message 9 is received (count=620) in register CM_EVT_READ_1. The comms master then determines the difference between this counter value and the previously recorded counter value CM_EVT_READ_0 taken at the time GDD message 6 was sent (count=560). This represents the elapsed time—in comms master counter increments—between sending of the GDD message to safety device 3 and receipt of its GDD response message. The comms master then divides this value by two to yield the estimated elapsed time—in comms master counter increments—between sending of GDD message 6 from the comms master to receipt of relayed GDD message 7 at safety device 3. In the present example, this duration is:

$$(\text{CM\_EVT\_READ\_1}-\text{CM\_EVT\_READ\_0})/2=(620-560)/2=30\text{ ms} \quad (2)$$

With this duration known, the comms master can estimate the comms master counter value corresponding to the time at which GDD message 7 was received at safety device 3 by adding this 30 ms duration to the count value of 560 previously recorded at the time GDD message 6 was sent, which yields:

$$\text{CM\_EVT\_READ\_0}+30=560+30=590\text{ ms} \quad (3)$$

Figure 13:
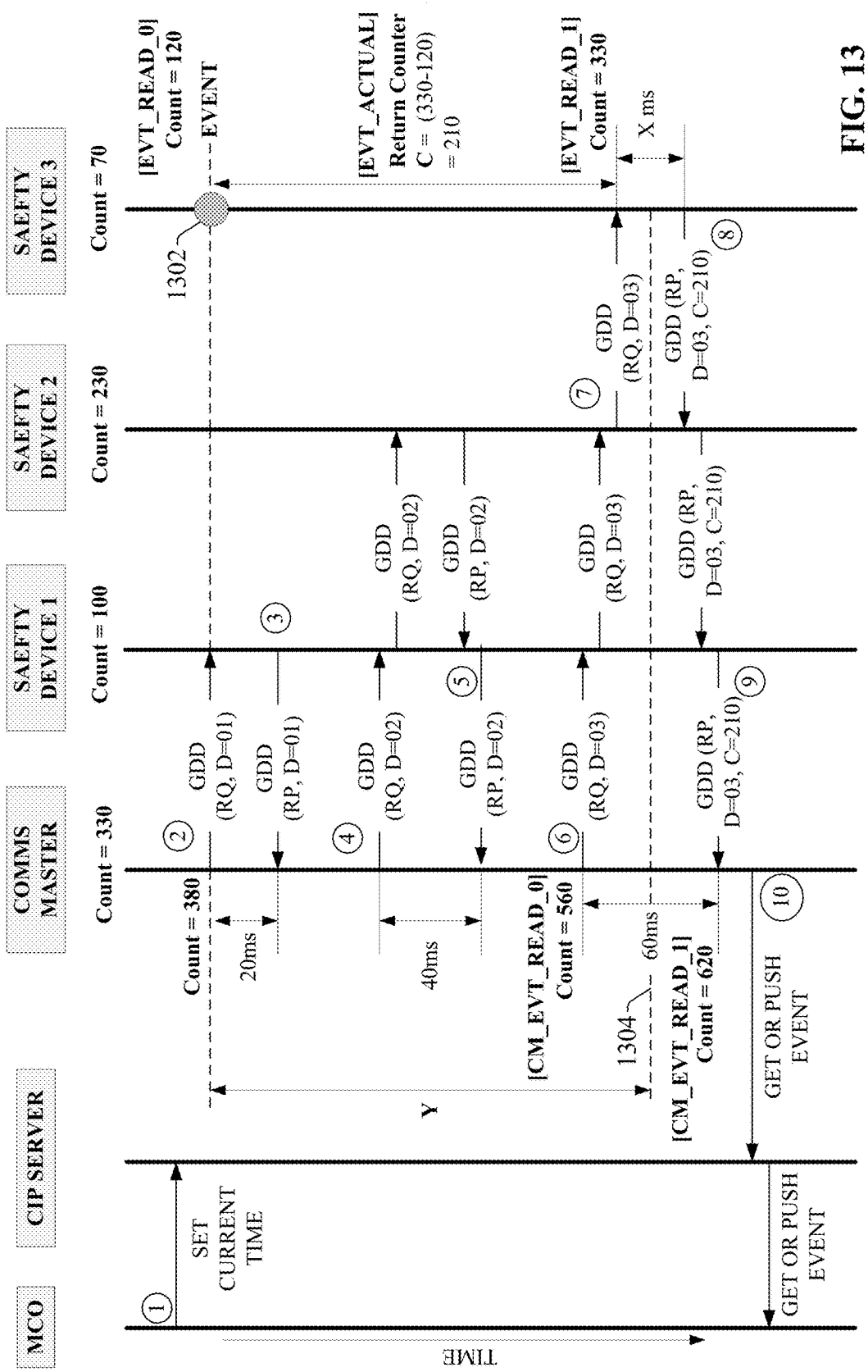
FIG. 13 is a timing diagram illustrating message exchanges between devices on a safety circuit in response to a switching event detected on a safety device on the safety circuit.

This is the comms master count value corresponding to line 1304 in FIG. 13, which is assumed to substantially align with the time at which safety device 3 received GDD message 7, and therefore substantially corresponds to the safety device 3 counter value (count=330) from which the Return Counter value was measured by safety device 3. Finally, to obtain the comms master count value corresponding to the switching event itself, the comms master subtracts the Return Counter value C reported in the GDD response message 9 from the value obtained using equation (3) to obtain:

$$590 - C = 590 - 210 = 380 \text{ ms} \qquad (4)$$

As shown in FIG. 13, this value corresponds to the comms master count value at the time GDD message 2 was sent in response to loss of the pulsed safety signal, which in turn was caused by detection of the switching event 1302 at safety device 3. Since the elapsed time between detection of the event 1302 at safety device 3 and detection of the loss of the safety signal at the comms master is negligible, this calculated comms master count value is reasonably concurrent to the time of the event within an acceptable degree of resolution. After determining this absolute count value corresponding to the event, the comms master sends a push event message (message 10) to the CIP server reporting the event and the calculated comms master count value of 380. In order to translate this comms master counter value to an absolute clock time, the CIP server stamps the record of the event with the master clock time corresponding to count value 380 of the comms master counter (based on the previously determined offset between the CIP server and the comms master, as described above in connection with FIG. 12). The CIP server may store the event record locally for later viewing or retrieval, or send a notification of the event to an external system or device.

Summarizing the calculations performed above, upon receipt of a GDD response message containing a value of LastDev=TRUE and reporting occurrence of a switching event at the responding safety device, the comms master determines the absolute counter value corresponding to the time of the event (CM_EVENT) according to the following:

$$\text{CM\_EVENT} = ([\text{CM\_EVT\_READ\_1} - \text{CM\_EVT\_READ\_0}]/2) + \text{CM\_EVT\_READ\_0} - \text{EVT\_ACTUAL} \qquad (5)$$

In the example described above, the time-stamp calculations treat the comms master duration Y as being equal to the Return Counter value C reported by safety device 3, even though these durations differ by X/2, where X is half of the turn-around time between receipt of GDD message 7 at safety device 3 and sending of GDD response message 8. If this turn-around time X is small (e.g., hundreds of microseconds), this difference of X/2 can be ignored without sacrificing acceptable accuracy. Alternatively, some embodiments of the time-stamping protocol can factor in this turn-around time value by adding X/2 to the Return Counter value C at safety device 3 before sending the Return Counter value to the comms master in GDD response message 8.

The time-stamping technique described above yields accurate time-stamping of events detected on a multi-device industrial safety circuit without requiring the safety devices and safety relays on the circuit to be synchronized with one another. As illustrated in the foregoing example, events detected by the individual safety devices (e.g., safety devices 904a-904e and 1102a-1102) are accurately time-stamped by the safety relay (the comms master of the single-wire safety system) even though the counters of the safety devices and the safety relay operate autonomously and are not synchronize with one another. The relative calculation techniques described above, together with the fact that recorded switching events on the single-wire safety system do not age appreciably before being recorded and time-stamped by the comms master, mitigates the need to synchronize the counters between the safety input devices and the safety relay to account for drift.

Figure 14:
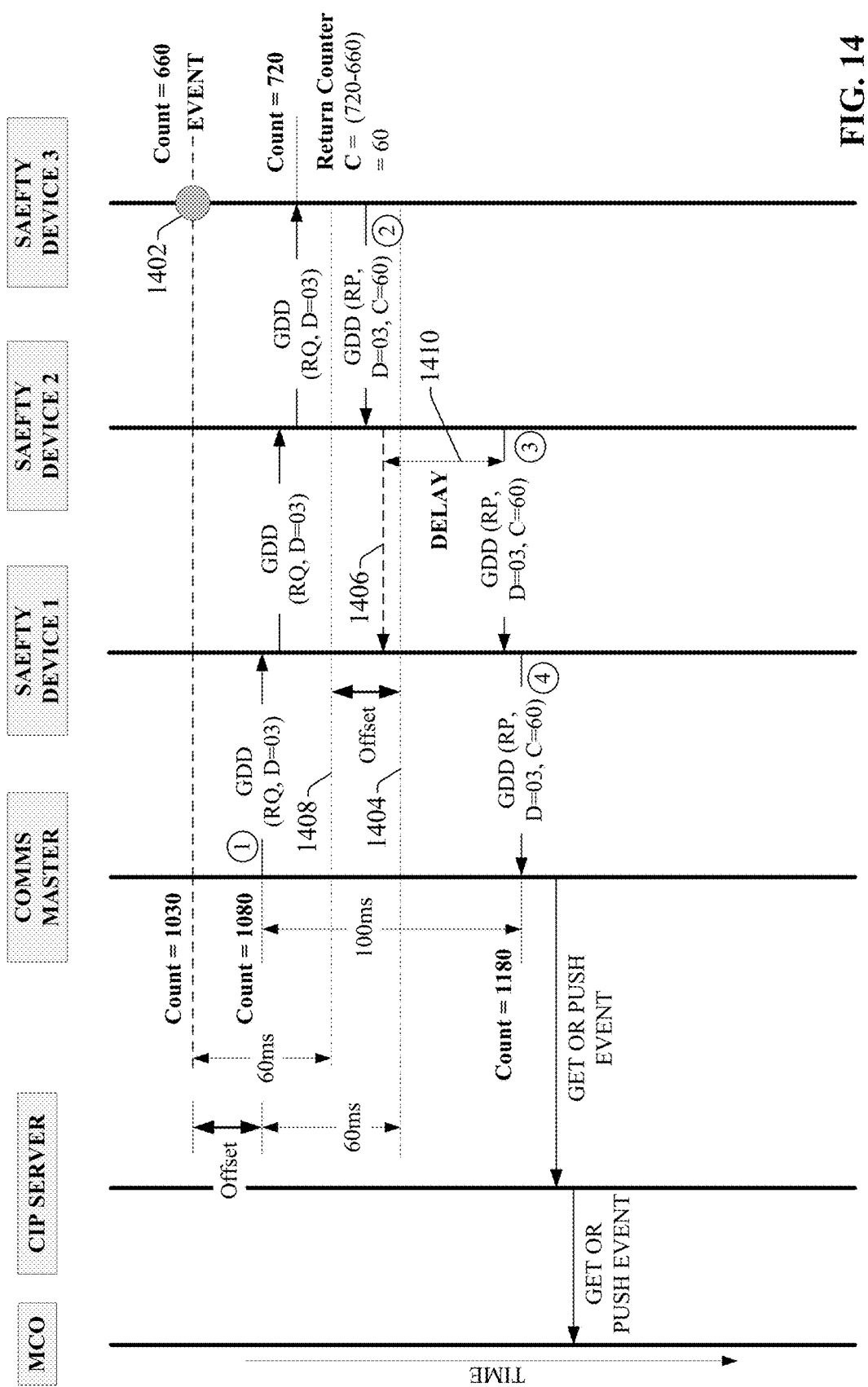
FIG. 14 is a timing diagram illustrating a GDD message transaction in which a GDD response message is delayed by an intermediate safety input device.

The calculation technique represented by equation (5) yields acceptable accurate results provided the turn-around time between sending of a GDD message from the comms master to a safety device and receipt of a corresponding GDD response message from the safety device is within a reasonable tolerance of an expected turn-around time (or transaction time) for that safety device. This is because equation (5) assumes that the half-way time between sending of a GDD message and receipt of a response (e.g., the time represented by line 1302 in FIG. 13) is substantially concurrent, within reasonable tolerances, with the reading of the EVT_READ_1 value by the safety device. However, unexpected delays in the turn-around of a GDD response message can cause loss of time-stamp accuracy, since the half-way time represented by line 1304 may no longer correspond to the EVT_READ_1 value. FIG. 14 is an example timing diagram illustrating this issue. As in the previous example, a switching event 1402 is detected by safety device 3. Some time later, the comms master sends a GDD message (message 1) directed to safety device 3, recording a count value of 1080 for CM_EVT_READ_0. The GDD message is relayed to safety device 3 over the single-wire channel as described in previous examples, and safety device 3 responds with a GDD response message (message 2) including a Return Counter value of 60 (the difference between the safety device counter value 720 at the time the GDD message was received and the counter value 660 at the time the event occurred, representing the elapsed time measured by safety device 3 between detection of the event and receipt of the GDD message).

However, in this example safety device 2 experiences a delay 1410 in relaying the GDD response message to safety device 1. Whereas safety device 2 would normally relay GDD response message 2 within a worst-case response time represented by message arrow 1406, safety device 2 instead sends the relayed GDD response message (message 3) after an unexpected time delay 1410 in excess of the expected worst-case transmission time for safety device 2. As a result, the final relayed GDD response message (message 4) from safety device 1 is received at the comms master at count=1180, some time after an expected worst-case round-trip duration for message exchanges with safety device 3. If this delay is not taken into consideration, the comms master count value calculated by equation (5) may not align with the actual time of the event 1402 within the required degree of accuracy.

The error introduced by this offset can be seen by comparing the result yielded when equation (5) is evaluated based on line 1408 versus the result yielded when equation (5) is evaluated based on line 1404. Line 1408 represents the half-way point between sending GDD message 1 and receiving GDD response message 4 if message 3 had not been delayed by safety device 2 (analogous to line 1304 of FIG. 13). This line substantially corresponds to the time at which safety device 3 received the GDD message and recorded the EVT_READ_1 value (count=720) on which the Return Counter value of 60 was based. Subtracting the 60 ms Return Counter value reported in the GDD response message yields a safety master count value (CM_EVENT) of 1030, which substantially aligns with the actual time of the event 1402.

However, since receipt of GDD response message 4 was delayed until count 1180 of the comms master, the half-way line 1404 between comms master counts 1180 and 1108 no longer aligns (within an acceptable tolerance) with the time at which the GDD message was received at safety device 3 due to the delay-induced offset. Consequently, subtracting the 60 ms Return Counter value from this offset half-way time yields an estimated event time that is later than the actual event time of count=1030. The difference between the actual comm master count value at the time of the event (count=1030) and this offset result is substantially equal to the difference between the expected and actual round-trip times for a message exchange between the comms master and the safety device. For example, if the expected worst-case round-trip time duration between sending a GDD message directed to safety device 3 by the comms master and receiving a GDD response message from safety device 3 at the comms master is 60 ms, and the actual measured round-trip duration is 100 ms (as determined by calculating the difference between CM_EVT_READ_1 and CM_EVT_READ_0), the CM_EVENT value calculated using equation (5) will exceed the actual comms master count value corresponding to the event by approximately 40 ms.

In order to identify and correct for abnormal delays, some embodiments of the comms master may be configured with knowledge of the expected worst-case round-trip times for GDD message transactions with each safety device on the single-wire safety circuit. As illustrated in the timing chart of FIG. 13, the round-trip time for a GDD message directed to a safety device on the single-wire safety circuit is partially a function of the position of the safety device on the circuit. For example, with reference to safety circuit 1104 of FIG. 11, GDD transactions with safety device 3 (address 1)—the safety input device nearest the comms master on the circuit—may have an expected worst-case round-trip time of Xms, while GDD transactions with safety device 2 (address 2) may have a worst-case transaction time of approximately 2× given the longer distance between the comms master and safety device 2, as well as the additional time required to relay the GDD message and response through safety device 3.

An example worst-case GDD transaction time for a given safety device as a function of device number n may be given by the following formula:

$$Tn=((M_R \times n)+(M_P \times n)+((n-1) \times 2d)+b) \times f \quad (6)$$

Where:

Tn is the total time for a GDD transaction with safety device n, $M_R$ is a message request packet time, $M_P$ is a message response packet time, d is a time required for an intermediate safety device to relay a message (port-to-port transfer time), b is time required for a safety device to process a GDD message and send a GDD response GDD message (acquisition and turn-around time), and f is a buffer value.

Figure 15:
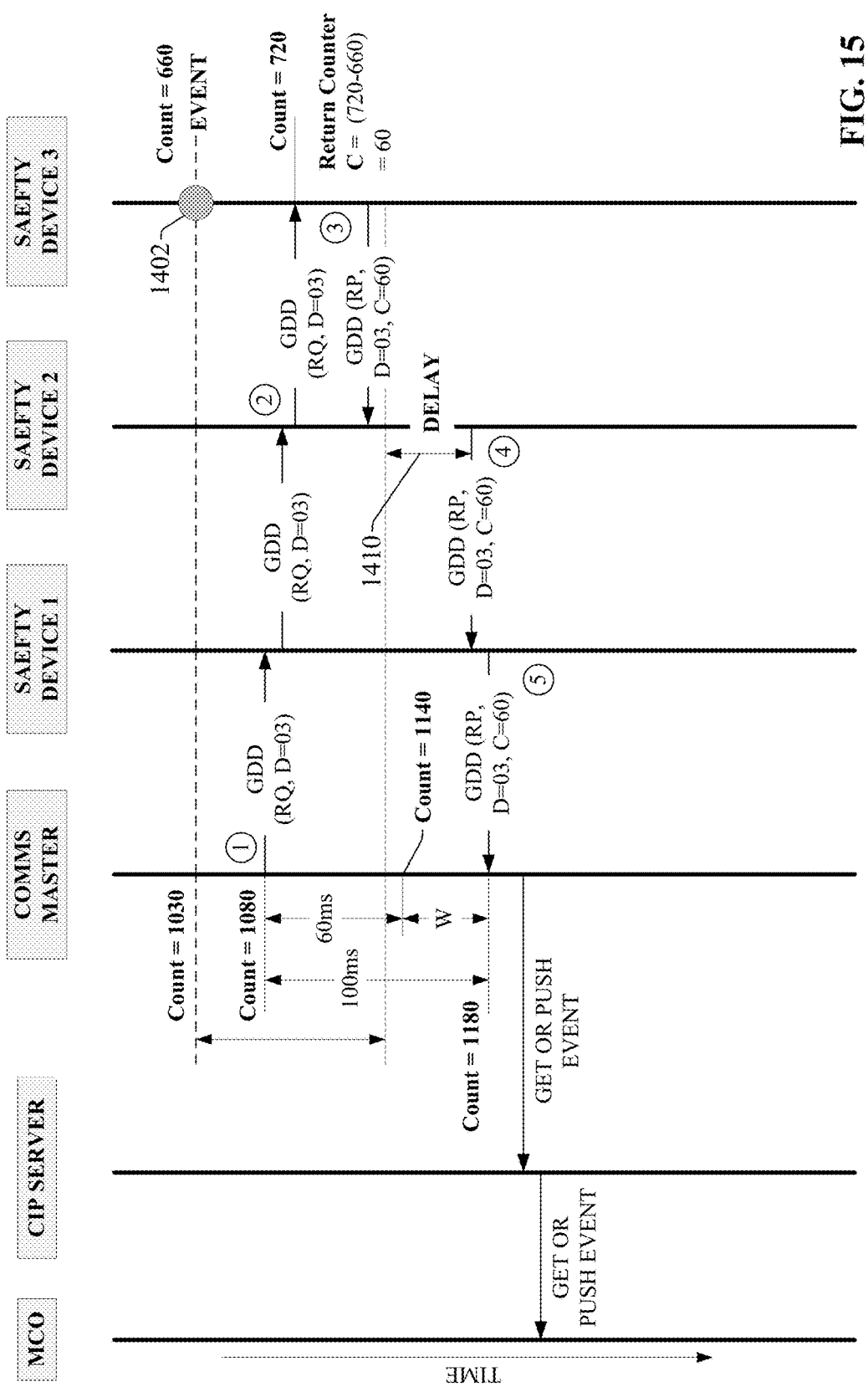
FIG. 15 is a timing diagram illustrating the delayed GDD transaction of with corrections made to account for the delay.

In one more embodiments, the comms master can be pre-configured with a formula (e.g., equation (6) or another formula for deriving an expected transaction time) for calculating expected values of Tn as a function of safety device address. With this information, the comms master can identify excessive delays in a GDD transaction and apply suitable corrections to the calculated time-stamp. FIG. 15 is a timing diagram illustrating the delayed GDD transaction of FIG. 14 with corrections made to account for the delay 1410 at safety device 2. As in the previous example, the comms master sends a GDD message 1 at count=1080 after an event 1402 is detected by safety device 3. Upon receipt of GDD message 2 from safety device 2, safety device 3 calculates its Return Counter value of 60 (the duration between detection of event 1402 and receipt of GDD message 2) and sends GDD response message 3 containing this Return Counter value (and any additional diagnostic information). Safety device 2 receives GDD response message 3 at its SWS+ INPUT terminal, but delays pass-through of GDD response message 4 to its SWS+ OUTPUT terminal, as represented by delay 1410. As a result, the comms master receives GDD response message 5 from safety device 1 100 ms after sending its initial GDD message 1 (at count=1180).

Upon receipt of GDD response message 5, the comms master makes a determination regarding whether the total transaction time between sending of GDD message 1 and receipt of GDD response message 5 is within a defined tolerance of the expected worst-case transaction time for safety device 3. In this example, the comms master expects the transaction time for safety device 3 to be 60 ms (e.g., based on equation (6) or another formula for determining the expected transaction time); that is, the comms master expected GDD response message 5 to arrive at count=1140. The delay W is therefore calculated as $$W = (\text{actual transaction time}) - (\text{expected transaction time}) = \quad (7)$$
$$100 - 60 = 40.$$

Since this 40 ms delay is outside the defined tolerance, the comms master calculates the value of CM_EVENT using a modified version of equation (5) that corrects for this delay:

CM_EVENT=([CM_EVT_READ_1−
CM_EVT_READ_0]/2)+CM_EVT_READ_0−
EVT_ACTUAL−W  (8)

In the example depicted in FIG. 15, this is evaluated as:

$$CM\_EVENT = ((1180 - 1080)/2) + 1080 - 60 - 40 = 1030$$

As can be seen in FIG. 15, this comms master count value substantially aligns with the time that the event 1402 was detected by safety device 3. This comms master count value is pushed to the CIP server together with the record of the event 1402, and the CIP server stamps the event record with a date/time stamp corresponding to the comms master count value of 1030.

The techniques described above provide a simple, lightweight method for accurately time-stamping events in a system comprising multiple series-connected devices that does not require clock synchronization between the system devices. Timing of events detected by slave devices on the system are determined relative to the master device (the safety relay acting as comms master) and are calculated based on message transaction times using simple arithmetic, so no sophisticated synchronization methods or hardware are required.

Although the time-stamping techniques have been described above in connection with a single-wire safety circuit, these techniques are applicable for any multi-device system comprising series-connected devices for which event time-stamping is required.

Figure 16:
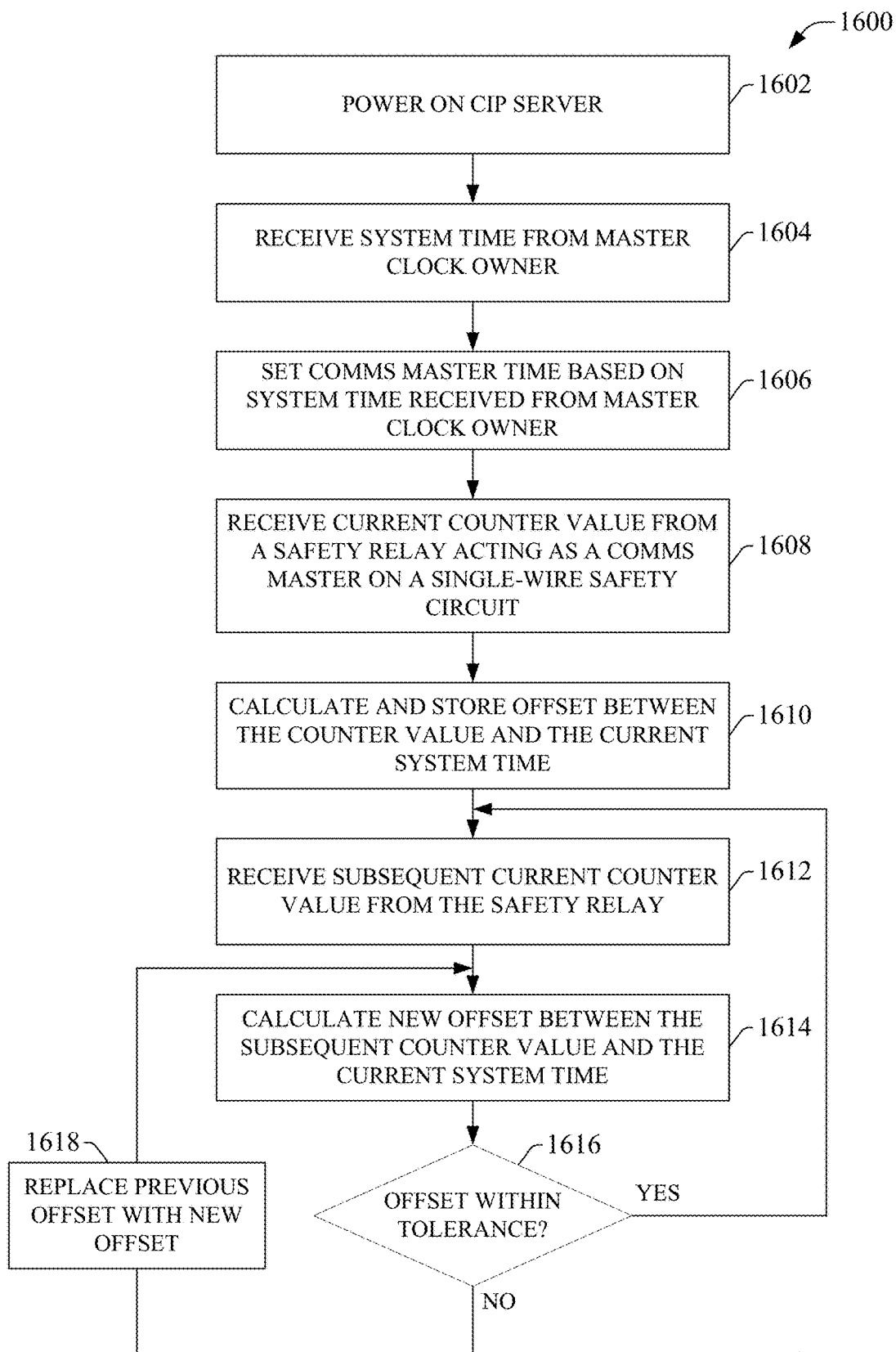
FIG. 16 is a flowchart of an example methodology for synchronizing a CIP server with a master clock in a system link time domain and with a safety relay counter in an SWS+ time domain for time-stamping purposes.
Figure 17:
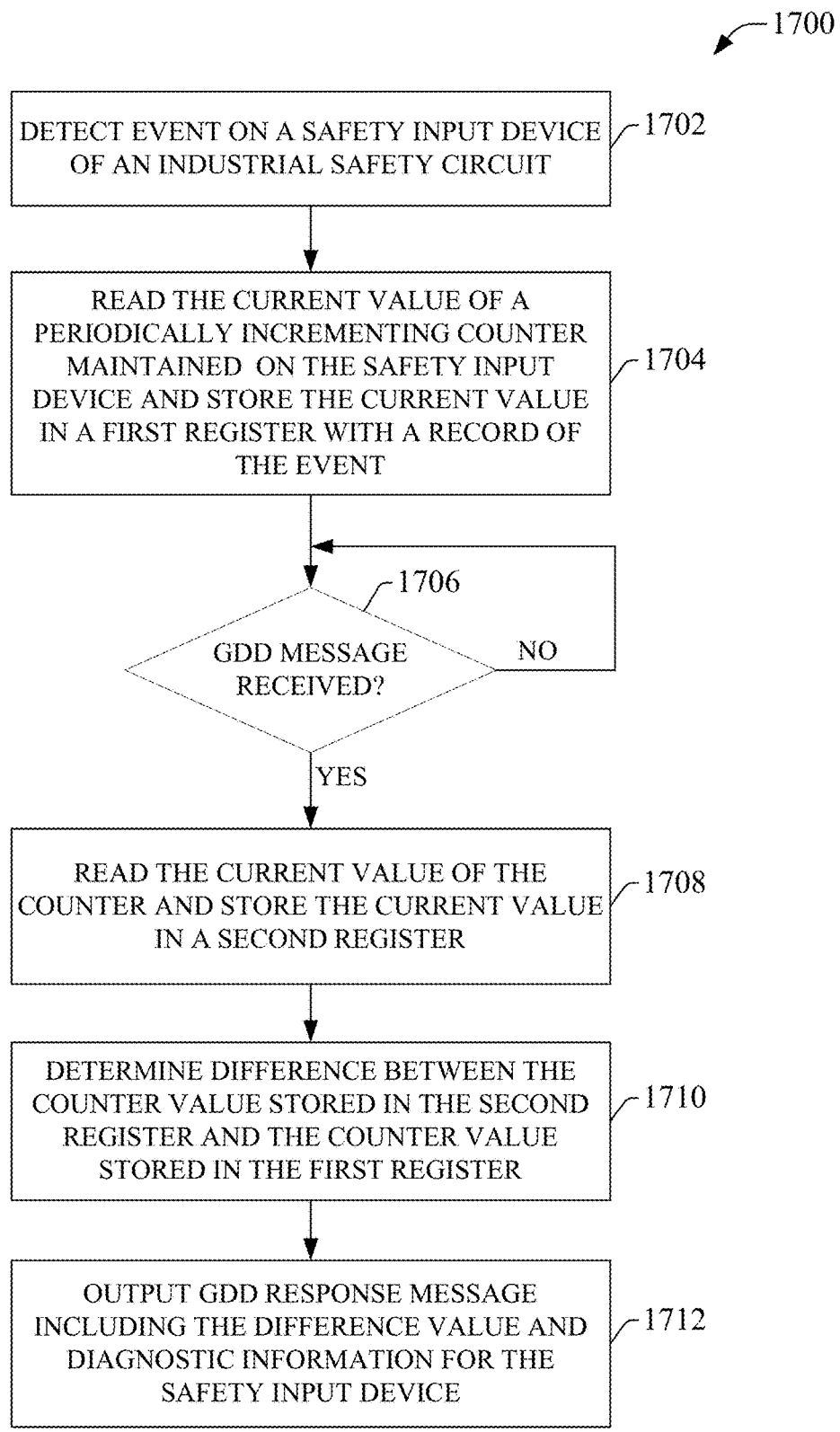
FIG. 17 is a flowchart of an example methodology for processing an event detected by a safety input device of an industrial safety circuit.

FIGS. 16-18 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 16 illustrates an example methodology 1600 for synchronizing a CIP server with a master clock in a system link time domain and with a safety relay counter in an SWS+ time domain for time-stamping purposes. Initially, at 1602, the CIP server is powered on. At 1604, a system time is received at the CIP server from a master clock owner. The master clock owner may be, for example, an industrial controller such as a PLC, or another type of external device maintaining its own clock value. At 1606, the comms master time is set based on the system time received from the master clock owner.

At 1608, a current counter value is received from a safety relay of an industrial safety circuit. The safety relay acts as a comms master on the safety circuit, which may be a single-wire safety circuit having the architecture and protocols described herein. The counter value is a value of a counter, maintained on the safety relay, that increments at a defined period (e.g., once every millisecond). At 1610, an offset is calculated between the counter value received at step 1608 and the current system time (determined based on the comms master time, which had been synchronized with the master clock owner in step 1606). This offset is stored on the CIP sever and serves as a conversion factor between safety relay counter values in the SWS+ time domain of the safety circuit to date/time values in the system link time domain of the CIP server and master clock owner.

At 1612, a subsequent counter value is received from the safety relay. The safety relay may read and send the subsequent current counter value when power is cycled on the relay, as part of a synchronization verification routine whereby the relay sends its current counter value to the CIP server on a periodic basis, or in response to other triggering conditions. At 1614, the offset between the subsequent counter value received at step 1612 and the current system time of the CIP server is calculated (using a technique similar to that used in step 1610). At 1616, a determination is made regarding whether the new offset matches the previously calculated offset within a defined tolerance. If the new offset matches the previously calculated offset, the methodology returns to step 1612 and awaits receipt of another counter value from the safety relay. Alternatively, if the new offset does not match the previously calculated offset, the previous offset is replaced with the new offset at step 1618, and the methodology returns to step 1612 to await receipt of another counter value from the safety relay.

FIG. 17 illustrates an example methodology 1700 for processing an event detected by a safety input device of an industrial safety circuit (e.g., the single-wire safety circuit described herein, or another industrial safety system architecture). Initially, at 1702, an event is detected on the safety input device. The event is dependent on the type of the safety input device. For example, if the safety input device is a light curtain, the event may be a light curtain broken or reset event. For a door safety switch, the event may be a door open or closed event. At 1704, the current value of a periodically incrementing counter on the safety input device is read, and the current value is stored in a first register with a record of the event. In some embodiments, the counter may be configured to increment every millisecond; however, other incrementing frequencies are also within the scope of one or more embodiments. The counter value in the first register represents the safety device counter value at the time the event was detected.

At 1706, a determination is made regarding whether a "get device diagnostics" (GDD) message is received at the safety input device. For single-wire safety systems, the GDD message may be received via an SWS+ OUTPUT terminal of the safety input device. The GDD message is a request from a safety relay (acting as a comms master for the safety circuit) for diagnostic information from the safety input device. If no GDD message is received, the methodology continues to wait until a GDD message is received. If the GDD message is received, the methodology proceeds to step 1708, where the current value of the counter is read and stored in a second register. This value represents the safety device's counter value at the time the GDD message was received.

At 1710, the difference between the counter values in the first and second registers is determined. This represents the duration—measured in safety device counter increments—since the event was detected. At 1712, a GDD response message is output by the safety input device (e.g., via the SWS+ OUTPUT terminal for single-wire systems). The GDD response message includes diagnostic information for the safety input device, as well as the difference value determined at step 1710. This difference value represents a Return Counter value subsequently used by the safety relay to calculate the absolute time—in safety relay device counter increments—at which the event occurred.

Figure 18A:
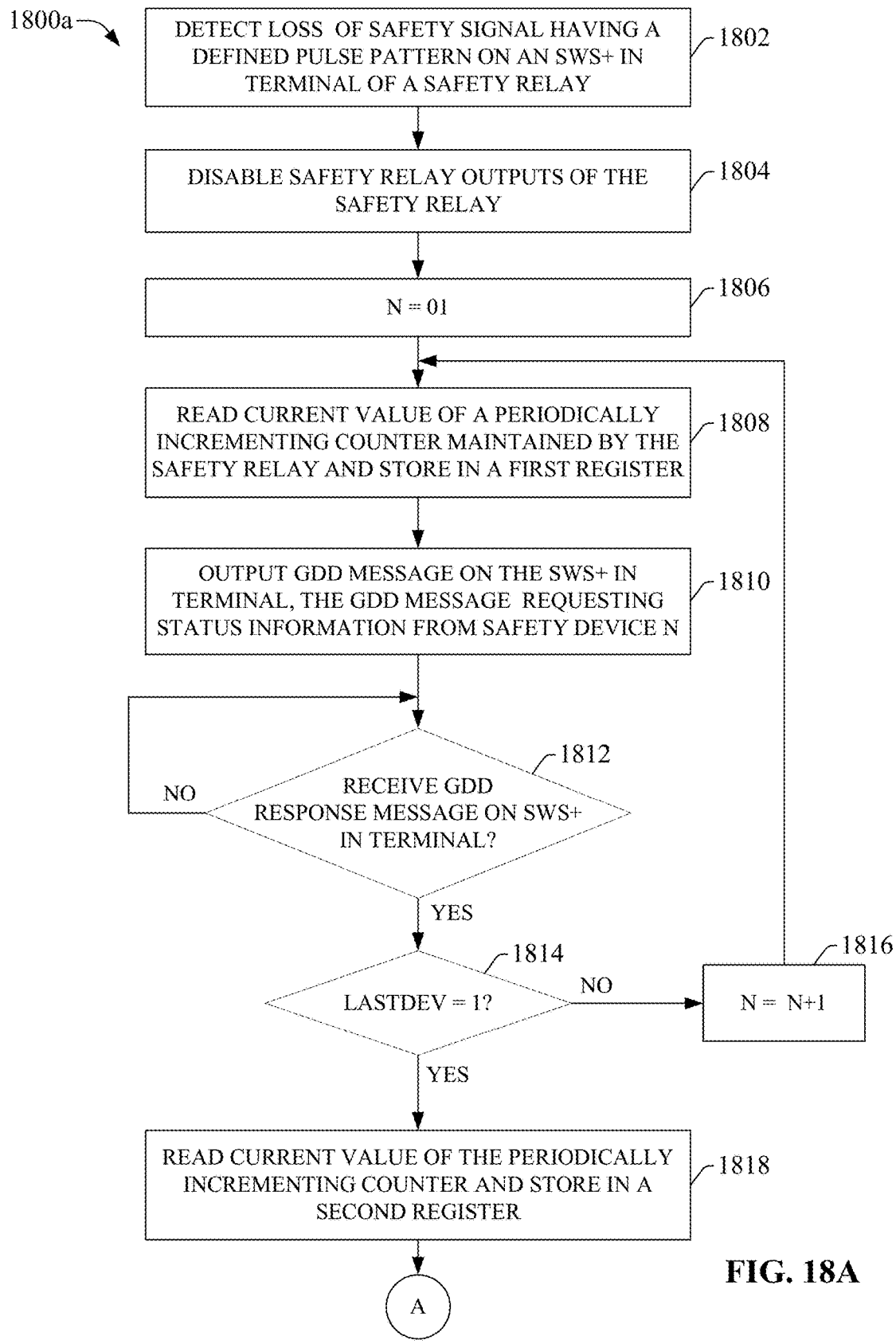
FIGS. 18A and 18B are flowcharts of an example methodology for time-stamping an event detected on an industrial safety circuit.

FIG. 18A illustrates a first part of an example methodology 1800a for time-stamping an event detected on an industrial safety circuit. Initially, at 1802, loss of a safety signal having a defined pulse pattern is detected on an SWS+ INPUT terminal of a safety relay. The safety relay may be serving as a comms master on a single-wire industrial safety system, such that loss of the safety signal indicates that one of the safety input devices on the safety circuit has switched to Safety Off mode. At 1804, the safety relay outputs of the safety relay are disabled in response to the detected loss of the safety signal.

At 1806, a variable N representing an address of a safety input device for which device information is to be collected is set to 01. At 1808, the current value of a periodically incrementing counter maintained on the safety relay (e.g., a counter that increments every millisecond) is read and stored in a first register. At 1810, a "get device diagnostics" (GDD) message directed to safety input device N is output via the SWS+ INPUT terminal of the safety relay.

At 1812, the safety relay waits for a GDD response message to be received on its SWS+ INPUT terminal. When the GDD response message is received, a determination is made regarding whether a LastDev flag contained in the GDD response message is set to 1. The LastDev indication indicates that the safety device corresponding to address N is the last device on the single-wire safety circuit able to receive the safety signal. If it is determined that the LastDev indication is 0, the methodology moves to step 1816, where N is incremented by one. The methodology then returns to step 1808, where the current value of the counter is again read and stored in the first register (replacing the previously read counter value), and another diagnostic message directed to the next address is output at step 1810. Alternatively, if it is determined that LastDev=1, safety device N is determined to be in Safety Off mode, and the methodology moves to step 1818, where the current value of the counter is read and stored in as second register. The counter value stored in the first register represents the time—in safety device counter increments—at which the GDD message was sent to safety device N, and the counter value stored in the second register represents the time at which the corresponding GDD response message was received.

Figure 18B:
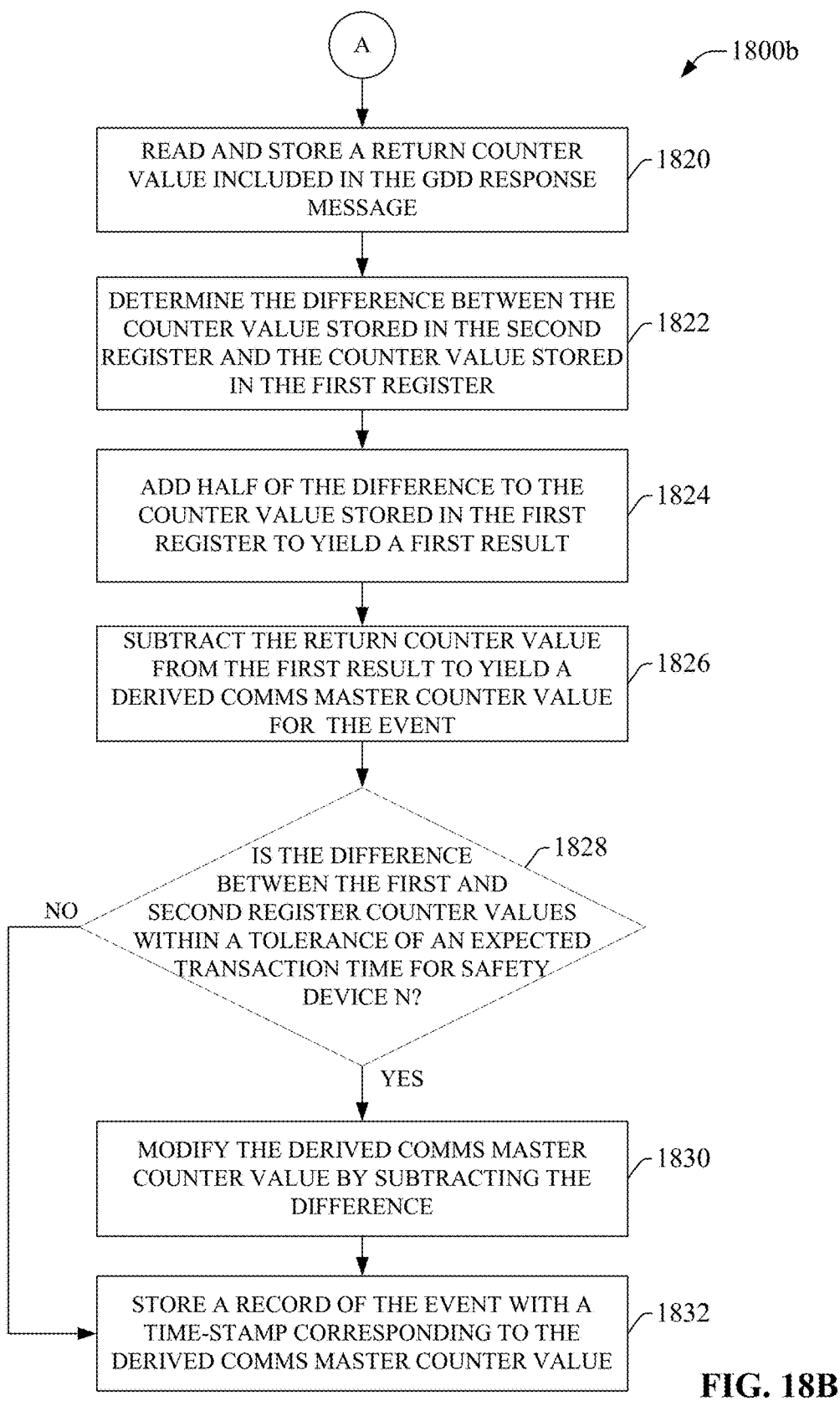

The methodology continues in FIG. 18B. At 1820, a return counter value included in the GDD response message received at step 1812 is read and stored. The return counter value represents a duration of time—measured in increments of a periodically incrementing counter maintained in safety device N—between detection of the event by the safety input device and receipt of the GDD message at the safety input device. At 1822, the difference between the counter values stored in the first and second registers is determined. This difference represents the total transaction time between sending the GDD message at step 1810 and receiving the GDD response message at step 1812. At 1824, half of the difference determined at step 1822 is added to the counter value stored in the first register to yield a first result. At 1826, the return counter value read in step 1820 is subtracted from the first result determined at step 1824 to yield a derived comms master counter value for the event. This value represents the calculated absolute time at which the event occurred in units of safety relay counter increments.

At 1828, a determination is made regarding whether the difference value determined at step 1822 is within a defined tolerance of an expected transaction time for safety device N. In this regard, the safety relay may be configured with expected transaction times for each device N on the safety circuit for comparison purposes in order to make the determination at step 1828. The expected transaction times may be explicitly defined for each device N in the safety relay's memory, or may be defined based on a formula (e.g., equation (6)) stored on the safety relay. Transaction times that exceed the expected transaction time in excess of the defined tolerance indicate delays in the GDD message transaction sufficiently excessive to cause inaccuracies in the calculated time-stamp for the event.

If it is determined at step 1828 that the difference is within the defined tolerance of the expected transaction time, the methodology proceeds to step 1832, where a record of the event is stored with a time-stamp corresponding to the derived comms master counter value determined at step 1826. This comms master counter value may be translated to a date/time format of a master clock based on a previously determined offset between the safety relay counter and the master clock (e.g., using methodology 1600 of FIG. 16). Alternatively, if it is determined at step 1828 that the difference is not within the defined tolerance, the methodology proceeds to step 1830, where the derived comms master counter value determined at step 1826 is modified by subtracting the difference value from the derived comms master counter value. This modification corrects for time-stamp calculation offsets caused by excessive GDD transaction delays. A time-stamp corresponding to this modified value is then stored with the record of the event, as described above in connection with step 1832.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 19:
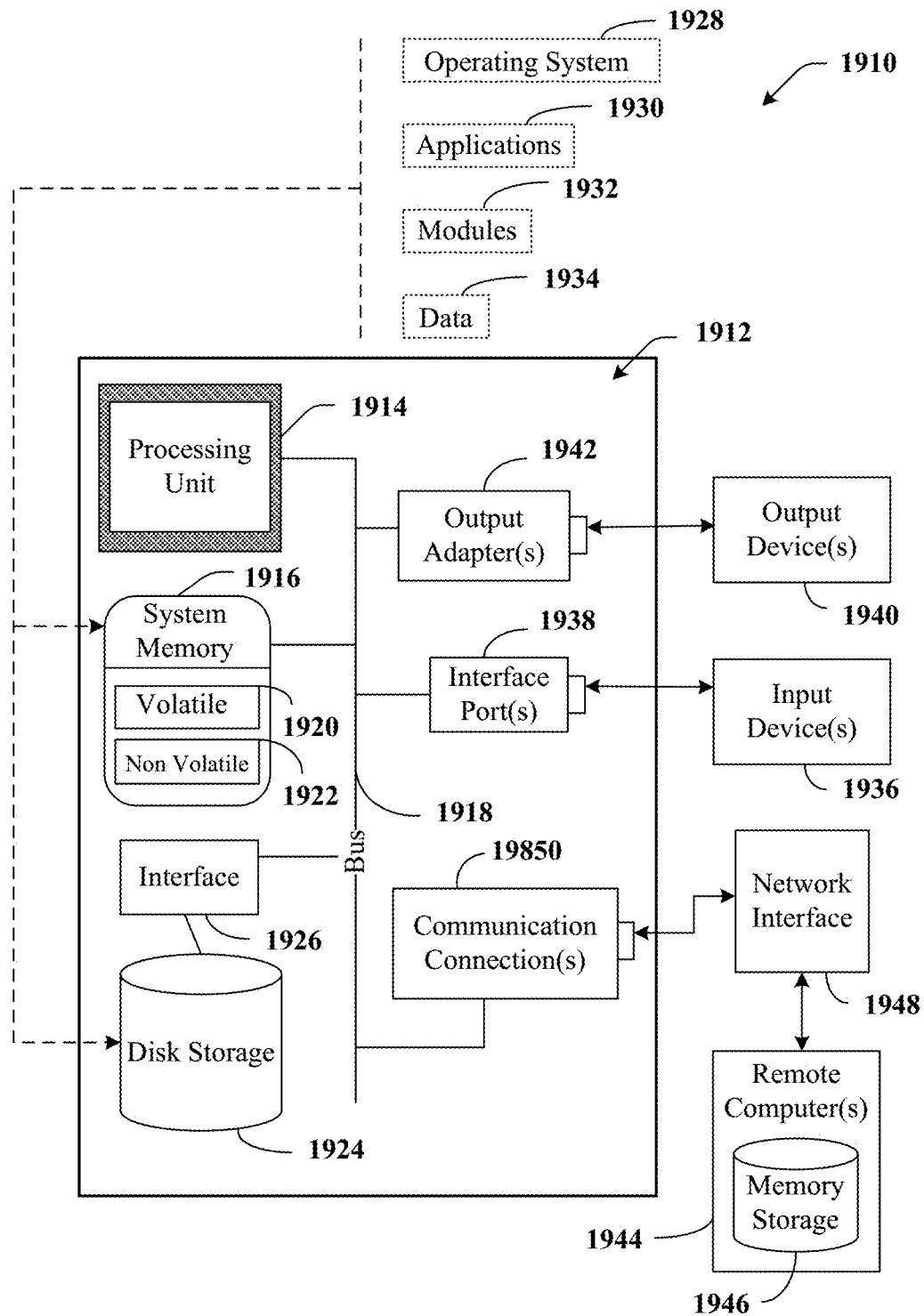
FIG. 19 is an example computing environment.
Figure 20:
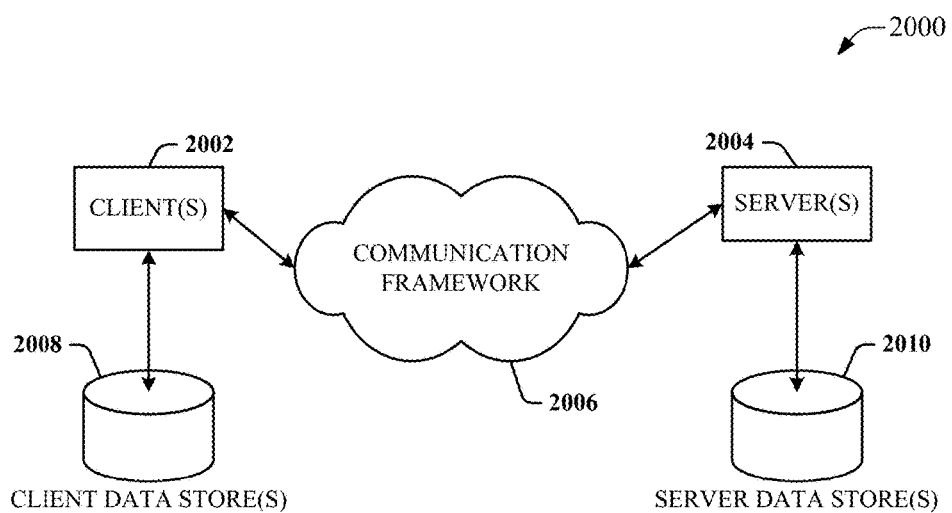
FIG. 20 is an example networking environment.

In order to provide a context for the various aspects of the disclosed subject matter, FIGS. 19 and 20 as well as the following discussion are intended to provide a brief, general description of a suitable environment in which the various aspects of the disclosed subject matter may be implemented.

With reference to FIG. 19, an example environment 1910 for implementing various aspects of the aforementioned subject matter includes a computer 1912. The computer 1912 includes a processing unit 1914, a system memory 1916, and a system bus 1918. The system bus 1918 couples system components including, but not limited to, the system memory 1916 to the processing unit 1914. The processing unit 1914 can be any of various available processors. Multi-core microprocessors and other multiprocessor architectures also can be employed as the processing unit 1914.

The system bus 1918 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1916 includes volatile memory 1920 and nonvolatile memory 1922. The basic input/output system (BIOS), containing the basic routines to transfer information between elements within the computer 1912, such as during start-up, is stored in nonvolatile memory 1922. By way of illustration, and not limitation, nonvolatile memory 1922 can include read only memory (ROM), programmable ROM (PROM), electrically programmable ROM (EPROM), electrically erasable PROM (EEPROM), or flash memory. Volatile memory 1920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1912 also includes removable/non-removable, volatile/nonvolatile computer storage media. FIG. 19 illustrates, for example a disk storage 1924. Disk storage 1924 includes, but is not limited to, devices like a magnetic disk drive, floppy disk drive, tape drive, Jaz drive, Zip drive, LS-100 drive, flash memory card, or memory stick. In addition, disk storage 1924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1924 to the system bus 1918, a removable or non-removable interface is typically used such as interface 1926.

It is to be appreciated that FIG. 19 describes software that acts as an intermediary between users and the basic computer resources described in suitable operating environment 1910. Such software includes an operating system 1928. Operating system 1928, which can be stored on disk storage 1924, acts to control and allocate resources of the computer 1912. System applications 1930 take advantage of the management of resources by operating system 1928 through program modules 1932 and program data 1934 stored either in system memory 1916 or on disk storage 1924. It is to be appreciated that one or more embodiments of the subject disclosure can be implemented with various operating systems or combinations of operating systems.

A user enters commands or information into the computer 1912 through input device(s) 1936. Input devices 1936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1914 through the system bus 1918 via interface port(s) 1938. Interface port(s) 1938 include, for example, a serial port, a parallel port, a game port, and a universal serial bus (USB). Output device(s) 1940 use some of the same type of ports as input device(s) 1936. Thus, for example, a USB port may be used to provide input to computer 1912, and to output information from computer 1912 to an output device 1940. Output adapters 1942 are provided to illustrate that there are some output devices 1940 like monitors, speakers, and printers, among other output devices 1940, which require special adapters. The output adapters 1942 include, by way of illustration and not limitation, video and sound cards that provide a means of connection between the output device 1940 and the system bus 1918. It should be noted that other devices and/or systems of devices provide both input and output capabilities such as remote computer(s) 1944.

Computer 1912 can operate in a networked environment using logical connections to one or more remote computers, such as remote computer(s) 1944. The remote computer(s) 1944 can be a personal computer, a server, a router, a network PC, a workstation, a microprocessor based appliance, a peer device or other common network node and the like, and typically includes many or all of the elements described relative to computer 1912. For purposes of brevity, only a memory storage device 1946 is illustrated with remote computer(s) 1944. Remote computer(s) 1944 is logically connected to computer 1912 through a network interface 1948 and then physically connected via communication connection 1950. Network interface 1948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1950 refers to the hardware/software employed to connect the network interface 1948 to the system bus 1918. While communication connection 1950 is shown for illustrative clarity inside computer 1912, it can also be external to computer 1912. The hardware/software necessary for connection to the network interface 1948 includes, for exemplary purposes only, internal and external technologies such as, modems including regular telephone grade modems, cable modems and DSL modems, ISDN adapters, and Ethernet cards.

FIG. 20 is a schematic block diagram of a sample computing environment 2000 with which the disclosed subject matter can interact. The sample computing environment 2000 includes one or more client(s) 2002. The client(s) 2002 can be hardware and/or software (e.g., threads, processes, computing devices). The sample computing environment 2000 also includes one or more server(s) 2004. The server(s) 2004 can also be hardware and/or software (e.g., threads, processes, computing devices). The servers 2004 can house threads to perform transformations by employing one or more embodiments as described herein, for example. One possible communication between a client 2002 and servers 2004 can be in the form of a data packet adapted to be transmitted between two or more computer processes. The sample computing environment 2000 includes a communication framework 2006 that can be employed to facilitate communications between the client(s) 2002 and the server(s) 2004. The client(s) 2002 are operably connected to one or more client data store(s) 2008 that can be employed to store information local to the client(s) 2002. Similarly, the server(s) 2004 are operably connected to one or more server data store(s) 2010 that can be employed to store information local to the servers 2004.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A safety relay device, comprising:
a memory that stores executable components;
a processor, operatively coupled to the memory, that executes the executable components, the executable components comprising:
a counter component configured to periodically increment a first counter at a defined frequency;
a diagnostic component configured to output a diagnostic request message directed to a safety input device on an industrial safety circuit and to record a first value of the first counter corresponding to a first time at which the diagnostic message was output, wherein the safety input device comprises a second counter; and
a message processing component configured to:
extract a return counter value included in a diagnostic response message received from the safety input device in response to the diagnostic request message, wherein the return counter value represents a difference between a second value of the second counter at a second time that the diagnostic request message was received at the safety input device and a third value of the second counter at a third time that an event was detected by the safety input device,
determine a difference between a fourth value of the first counter corresponding to a fourth time at which the diagnostic response message is received at the safety relay device and the first value of the first counter,
add half or approximately half of the difference to the first value of the first counter to yield a first result,
subtract the return counter value from the first result to yield an event counter value, and
generate a time-stamp for the event based on a clock value corresponding to the event counter value.

2. The safety relay device of claim 1, wherein the diagnostic component is configured to output the diagnostic request message via a safety channel terminal of the safety relay device in response to a detected loss of a safety signal on the safety channel terminal or a detected reinstatement of the safety signal on the safety channel terminal.

3. The safety relay device of claim 2, wherein the diagnostic component is configured to receive the diagnostic response message via the safety channel terminal.

4. The safety relay device of claim 2, further comprising a relay control component configured to control a state of one or more safety relays based on presence or absence of the safety signal on the safety channel terminal.

5. The safety relay device of claim 2, further comprising a pulse verification component configured to determine verify that the pulsed safety signal conforms to a defined pulse pattern.

6. The safety relay of claim 1, wherein the message processing component is further configured to determine whether the difference between the fourth value of the first counter and the first value of the first counter is within a tolerance of a defined expected transaction time associated with the safety input device; and
in response to determining that the difference is not within the tolerance:
subtract the expected transaction time from the difference to yield a second result;
subtract the second result from the event counter value to yield a modified event counter value; and
generate the time-stamp as another clock value corresponding to the modified event counter value.

7. The safety relay device of claim 1, wherein the message processing component is further configured to generate the time-stamp based on a predetermined offset between a time of a master clock and the first counter.

8. The safety relay device of claim 1, further comprising a communication interface component configured to send an indication of the event and the time-stamp to an external device.

9. The safety relay device of claim 1, wherein the event is at least one of an emergency stop pushbutton pressed event, an emergency stop pushbutton reset event, a light curtain broken event, a light curtain reset event, a safety door open event, a safety door closed event, a safety mat status event, an emergency pull-cord pulled event, an emergency pull-cord reset event, a laser scanner object detection event, or a photoelectric sensor object detection event.

10. A method for time-stamping events on an industrial safety circuit, comprising:
sending, by a safety relay device comprising at least one processor, a diagnostic request message directed to a safety input device on the industrial safety circuit;

storing, by the safety relay device, a first value of a periodically incrementing first counter maintained on the safety relay device in a first register, wherein the first value corresponds to a first time of the sending of the diagnostic request message;

receiving, by the safety relay device, a diagnostic response message in response to the diagnostic request message, wherein the diagnostic response message includes at least a return counter value generated by the safety input device, and wherein the return counter value is based on a difference between a second value of a second counter, maintained on the safety input device, at a second time that the diagnostic request message was received at the safety input device and a third value of the second counter at a third time that an event was detected by the safety input device;

storing, by the safety relay device, a fourth value of the first counter in a second register, wherein the fourth value corresponds to a fourth time of the receiving the diagnostic response message;

reading, by the safety relay device, the return counter value included in the diagnostic response message;

determining, by the safety relay device, a difference between the fourth value of the first counter and the first value of the first counter;

adding, by the safety relay device, half or approximately half of the difference to the first value of the first counter to yield a first result;

subtracting, by the safety relay device, the return counter value from the first result to yield an event counter value; and generating, by the safety relay device, a time-stamp for the event comprising a clock value corresponding to a fifth value of the first counter equal to the event counter value.

11. The method of claim 10, further comprising:
detecting, by the safety relay device, at least one of a loss or a reinstatement of a safety signal on a safety input terminal of the safety relay device,
wherein the sending comprises sending the diagnostic request message via the safety input terminal in response to the detecting.

12. The method of claim 11, wherein the receiving comprises receiving the diagnostic response message via the safety input terminal.

13. The method of claim 11, further comprising controlling, by the safety relay device, a state of one or more safety relays based on at least one of the loss or the reinstatement of the safety signal on the safety input terminal.

14. The method of claim 11, further comprising detecting, by the safety relay device, the loss or the reinstatement of the safety signal based on a determination of whether the safety signal comprises a pulse pattern that matches a defined pulse pattern.

15. The method of claim 10, wherein the generating further comprises:
determining whether the difference between the fourth value of the first counter and the first value of the first counter is within a defined range of an expected transaction time defined for the safety input device; and
in response to determining that the difference is not within the defined range:
subtracting the expected transaction time from the difference to yield a second result;
subtracting the second result from the event counter value to yield a modified event counter value; and
generating, as the time-stamp, another clock value corresponding to a sixth value of the counter equal to the modified event counter value.

16. The method of claim 10, wherein the generating the time-stamp comprises generating the time-stamp based on a predetermined offset between a master clock and the first counter.

17. A non-transitory computer-readable medium having stored thereon instructions that, in response to execution, cause a safety relay device comprising a processor to perform operations, the operations comprising:
outputting, via a safety channel terminal of the safety relay device, a diagnostic request message addressed to a safety input device on an industrial safety circuit;
recording a first value of a periodically incrementing first counter maintained on the safety relay device in a first register, wherein the first value corresponds to a first time of the outputting of the diagnostic request message;
receiving, via the safety channel terminal, a diagnostic response message in response to the diagnostic request message, wherein the diagnostic response message comprises at least a return counter value generated by the safety input device, and the return counter value is a difference between a second value of a second counter, maintained on the safety input device, at a second time that the diagnostic request message was received at the safety input device and a third value of the second counter at a third time that an event was detected by the safety input device;
recording a fourth value of the first counter in a second register, wherein the fourth value corresponds to a fourth time of the receiving of the diagnostic response message;
reading the return counter value from the diagnostic response message;
determining a difference between the fourth value of the first counter and the first value of the first counter;
adding half of the difference to the first value of the first counter to yield a result;
subtracting the return counter value from the result to yield an event counter value; and
determining a clock value corresponding to a fifth value of the counter equal to the event counter value; and
setting the clock value as a time-stamp for the event.

18. The non-transitory computer-readable medium of claim 17, wherein the operations further comprise:
detecting at least one of a loss or a reinstatement of a safety signal on a safety input terminal of the safety relay device,
wherein the outputting comprises outputting the diagnostic request message via the safety input terminal in response to the detecting.

19. The non-transitory computer-readable medium of claim 18, wherein the operations further comprise controlling a state of a safety relay based on at least one of the loss or the reinstatement of the safety signal on the safety input terminal.

20. The non-transitory computer-readable medium of claim 18, wherein the operations further comprise detecting the loss or the reinstatement of the safety signal based on a determination of whether the safety signal comprises a pulse pattern that matches a defined pulse pattern.

* * * * *